US008462842B2

(12) United States Patent
Ye et al.

(10) Patent No.: US 8,462,842 B2
(45) Date of Patent: Jun. 11, 2013

(54) SYMMETRY FOR INTERPOLATION FILTERING OF SUB-PIXEL POSITIONS IN VIDEO CODING

(75) Inventors: Yan Ye, San Deigo, CA (US); Marta Karczewicz, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 369 days.

(21) Appl. No.: 12/420,283

(22) Filed: Apr. 8, 2009

(65) Prior Publication Data

US 2009/0257494 A1    Oct. 15, 2009

Related U.S. Application Data

(60) Provisional application No. 61/044,020, filed on Apr. 10, 2008, provisional application No. 61/044,023, filed on Apr. 10, 2008, provisional application No. 61/044,240, filed on Apr. 11, 2008, provisional application No. 61/057,373, filed on May 30, 2008.

(51) Int. Cl.
*H04N 7/12* (2006.01)
*G09G 5/00* (2006.01)

(52) U.S. Cl.
USPC .......................................... 375/240; 345/611

(58) Field of Classification Search
USPC ........................................................ 375/240
See application file for complete search history.

(56) References Cited

U.S. PATENT DOCUMENTS

| | | |
|---|---|---|
| 2001/0022816 A1 | 9/2001 | Bakhmutsky et al. |
| 2001/0048647 A1 | 12/2001 | Abe et al. |
| 2003/0194011 A1 | 10/2003 | Srinivasan |
| 2004/0012610 A1 | 1/2004 | Taneja et al. |
| 2004/0062307 A1 | 4/2004 | Hallapuro et al. |
| 2004/0213470 A1 | 10/2004 | Sato et al. |
| 2005/0207496 A1 | 9/2005 | Komiya et al. |

(Continued)

FOREIGN PATENT DOCUMENTS

| | | |
|---|---|---|
| EP | 1603338 | 12/2005 |
| EP | 1641274 | 3/2006 |

(Continued)

OTHER PUBLICATIONS

International Search Report—PCT/US09/040263, International Search Authority—European Patent Office—Jul. 20, 2009.

(Continued)

*Primary Examiner* — Sath V Perungavoor
*Assistant Examiner* — Xiaolan Xu
(74) *Attorney, Agent, or Firm* — Todd E. Marlette

(57) ABSTRACT

This disclosure describes filtering techniques applied by an encoder and a decoder during the prediction stage of a video encoding and/or decoding process. The filtering techniques may enhance the accuracy of predictive data used during fractional interpolation, and may improve predictive data of integer blocks of pixels. There are several aspects to this disclosure, including a useful twelve-pixel filter support that may be used for interpolation, techniques that use coefficient symmetry and pixel symmetry to reduce the amount of data needed to be sent between an encoder and a decoder to configure the filter support for interpolation, and techniques for filtering data at integer pixel locations in a manner that is similar to sub-pixel interpolation. Other aspects of this disclosure concern techniques for encoding information in the bitstream to convey the type of filter used, and possibly the filter coefficients used. Predictive coding of filter coefficients is also described.

50 Claims, 26 Drawing Sheets

U.S. PATENT DOCUMENTS

| | | | |
|---|---|---|---|
| 2006/0093039 | A1 | 5/2006 | Yasuda et al. |
| 2008/0037656 | A1 | 2/2008 | Hannuksela |
| 2008/0056389 | A1 | 3/2008 | Chiang et al. |
| 2008/0247467 | A1* | 10/2008 | Rusanovskyy et al. .. 375/240.16 |
| 2009/0097545 | A1 | 4/2009 | Ugur et al. |
| 2009/0257493 | A1 | 10/2009 | Ye et al. |
| 2009/0257501 | A1 | 10/2009 | Ye et al. |

FOREIGN PATENT DOCUMENTS

| | | |
|---|---|---|
| JP | 61210599 | 9/1986 |
| JP | 2001273718 A | 10/2001 |
| JP | 2003339050 A | 11/2003 |
| JP | 2004297768 A | 10/2004 |
| JP | 2005514872 A | 5/2005 |
| JP | 2005318297 A | 11/2005 |
| JP | 2006135376 A | 5/2006 |
| KR | 1020081116 A | 10/2003 |
| KR | 20050018948 A | 2/2005 |
| KR | 2007045662 A | 5/2007 |
| RU | 2302707 C2 | 7/2007 |
| RU | 2305377 C2 | 8/2007 |
| WO | 03026296 A1 | 3/2003 |
| WO | 03058945 | 7/2003 |
| WO | 2004006558 A2 | 1/2004 |
| WO | 06108654 | 10/2006 |
| WO | WO2008010929 A2 | 1/2008 |
| WO | 08084378 | 7/2008 |

OTHER PUBLICATIONS

International Search Report—PCT/US09/040270, International Search Authority—European Patent Office—Jul. 14, 2009.
Written Opinion—PCT/US09/040263, International Search Authority—European Patent Office—Jul. 20, 2009.
Written Opinion—PCT/US09/040270, International Search Authority—European Patent Office—Jul. 14, 2009.
Y. Vatis and J. Ostermann, "Comparison of Complexity Between Two-Dimensional Non-Separable Adaptive Interpolation Filter and Standard Wiener Filter," ITU-T SGI 6/Q.6 Doc. VCEG-AA11, Nice, France, Oct. 2005.
S. Wittmann, T. Wedi, "Separable Adaptive Interpolation Filter," ITU-T SG 16/Q.6 Doc. T05-SG16-C-0219, Geneva, Switzerland, Jun. 2007.
D. Rusanovskyy, K. Ugur, J. Lainema, "Adaptive Interpolation with Directional Filters," ITU-T SG16/Q.6 Doc. VCEG-AG21, Shenzhen, China.
J. Jung and G. Laroche, "Performance Evaluation of the KTA 1.2 Software," ITU-T SG16/Q.6 VCEG, VCEG-AE09, Marrakech, Morocco, Jan. 2007.
Wiegand T er al: "Overview of the H.24/AVC video coding standard" IEEE Transactions on Circuts and Systems for Video Technology, IEEE Service Center, Piscataway, NJ, US, vol. 13, No. 7, Jul. 1, 2003, pp. 560-576, XP011099249.
Vatis Y et al: "Motion-and Aliasing-Compensated Prediction Using a Two-Dimensional Non-Separabie Adaptive Wiener Interpolation Filter" Image Processing, 2005. ICIP 2005. IEEE International Conference on Genova, Italy Sep. 11-14, 2005, Piscataway, NJ, USA.
Qualcomm: "Switched Interpolation Filter with Offset" ITU-T SG16/Q.6 DOC. T05-SG-C 463 -E, International Telecommunication Union, Geneva, CH, Apr. 14, 2008, pp. 1-4, XP007908845.
International Search Report—PCT/US09/040267 International Search Authority—European Patent Office—Jul. 20, 2009.
Written Opinion—PCT/US09/040267, International Search Authority—European Patent Office—Jul. 20, 2009.
Bjontegaard G et al: "Adaptive deblocking filter" IEEE Transactions on Circuits and Systems for Video Technology, IEEE Service Center, Piscataway, NJ, US, vol. 13, No. 7, Jul. 1, 2003, pp. 614-619, XP011099254.
Li X., et al., "New Edge-Direction Interpolation", IEEE Transactions on Image Processing, vol. 10, No. 10, Oct. 2001.
Qualcomm: "Enhanced Adaptive Interpolation Filter", Apr. 14, 2008, ITU-T SG16IQ.6 DOC. T05-SG16-C 464-E, International Telecommunication Union, Geneva, CH, pp. 1-4, XP007908846.
Rusanovskyy D., et al., "Spatio-Temporal Adaption of Interpolation Filter for Low Complexity Decoding", 31. VCEG Meeting; 79. MPEG Meeting; Jan. 15, 2007-Jan. 16, 2007; Marrakech; (Video Coding Experts Group of ITU-TSG.16),, No. VCEG-AE22, Jan. 14, 2007, XP030003525, ISSN: 0000-0157.
Ugur K. et al., "Adaptive Interpolation Filter with Flexible Symmetry for Coding High Resolution High Quality Video", Acoustics, Speech and Signal Processing, 2007. ICASSP, 2007 IEEE International Conference on vol. 1, Apr. 15-20, 2007, pp. 1-1013.
Wedi et al., "Direct Interpolation Filters in TML-6,ITU—Telecommunications.Standardization Sector Study Group 16 Question 6 Video Coding Experts Group (VCEG)",Thirteenth Meeting: Austin, Texas, USA,Apr. 2001,VCEG-M44, pp. 1-5.
Chen Z., et al., "Fast Integer Pel and Fractional Pel Motion Estimation for JVT", Joint Video Team (JVT) of ISO/IEC MPEG & ITU-T VCEG, JVT-F017, 6 Meeting: Awaji, Island, Dec. 5-13, 2002.
Karczewicz M., et al., "Interpolation solution with low encoder memory requirements and low decoder complexity", ITU—Telecommunications Standardization Sector Study Group 16 Question 6 Video Coding Experts Group (VCEG), VCEG-N31, Twelfth Meeting: Santa Barbara, Sep. 24-27, 2001.
Rusanovskyy, D., et al., "Spatial and Temporal Adaptation of Interpolation Filter for Low Complexity Encoding/Decoding", Multimedia signal processing 2007, Oct. 2007, pp. 163-167.
Wedi T., "Adaptive Interpolation Filter for Motion Compensated Hybrid Video Coding", Picture Coding Symposium (PCS 2001), Seoul, Korea, Apr. 2001.

* cited by examiner

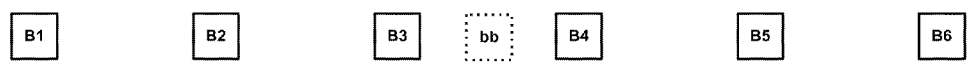
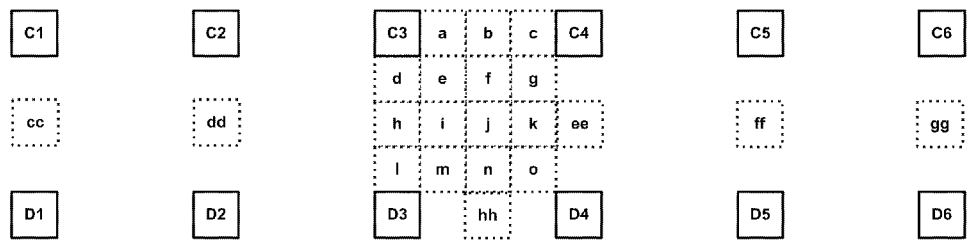
FIG. 3

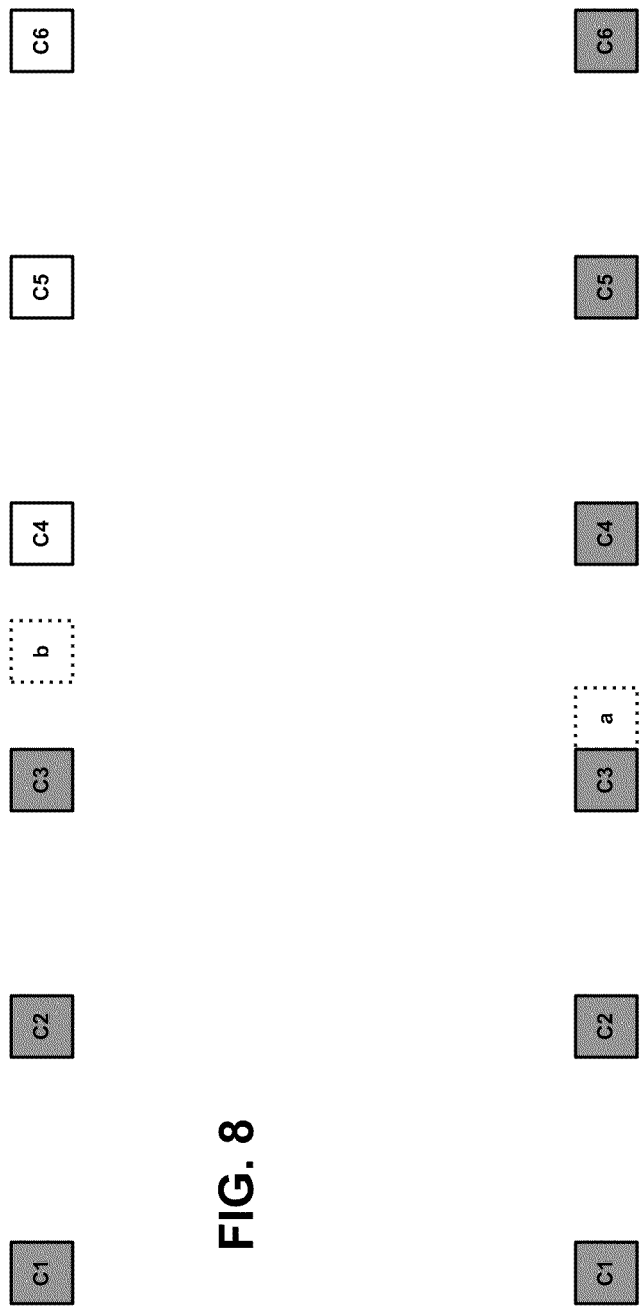

FIG. 10           FIG. 11

| h0, 0 | h0, 1 | h0, 2 | h0, 3 | h0, 4 |
|-------|-------|-------|-------|-------|
| h1, 0 | h1, 1 | h1, 2 | h1, 3 | h1, 4 |
| h2, 0 | h2, 1 | h2, 2 | h2, 3 | h2, 4 |
| h3, 0 | h3, 1 | h3, 2 | h3, 3 | h3, 4 |
| h4, 0 | h4, 1 | h4, 2 | h4, 3 | h4, 4 |

FIG. 29

SYMMETRY FOR INTERPOLATION FILTERING OF SUB-PIXEL POSITIONS IN VIDEO CODING

This application claims the benefit of U.S. Provisional Application 61/044,020 filed on Apr. 10, 2008, U.S. Provisional Application 61/044,023 filed on Apr. 10, 2008, U.S. Provisional Application 61/044,240 filed on Apr. 11, 2008, and U.S. Provisional Application No. 61/057,373 filed on May 30, 2008 the entire contents of which are incorporated herein by reference.

TECHNICAL FIELD

This disclosure relates to digital video encoding and decoding and, more particularly, filtering techniques applied to generate predictive data used in the video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in standards defined by MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of encoded video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the one or more reference frames or other coded units. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that reduces the number of bits associated with any given transform coefficient. Entropy coding comprises one or more processes that collectively compress a sequence of coding modes, motion information, coded block patterns, and quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder can reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation techniques have been developed in order to improve the level of compression that can be achieved in inter-coding. In this case, the predictive data generated during motion compensation, which is used to code a video block, may be interpolated from the pixels of video blocks of the video frame or other coded unit used in motion estimation. Interpolation is often performed to generate predictive half pixel (half-pel) values and predictive quarter pixel (quarter-pel) values. The half- and quarter-pel values are associated with sub-pixel locations. Fractional motion vectors may be used to identify video blocks at the sub-pixel resolution in order to capture fractional movement in a video sequence, and thereby provide predictive blocks that are more similar to the video blocks being coded than the integer video blocks.

SUMMARY

In general, this disclosure describes filtering techniques applied by an encoder and a decoder during the prediction stage of a video encoding and/or decoding process. The described filtering techniques may enhance the accuracy of predictive data used during fractional interpolation, and in some cases, may improve predictive data of integer blocks of pixels. There are several aspects to this disclosure, including a useful twelve-pixel filter support that may be used for interpolation, techniques that use coefficient symmetry and pixel symmetry to reduce the amount of data needed to be sent between an encoder and a decoder to configure the filter support for interpolation, and techniques for filtering data at integer pixel locations in a manner that is similar to sub-pixel interpolation. Other aspects of this disclosure concern techniques for encoding information in the bitstream to convey the type of filter, and possibly the filter coefficients used. Predictive encoding techniques for filter coefficients are also described. These and other aspects of this disclosure will become apparent from the description below.

In one example, this disclosure provides a method comprising receiving eight sets of filter coefficients as part of an encoded video bitstream, generating fifteen sets of filter coefficients corresponding to fifteen different sub-pixel locations based on the eight sets of filter coefficients, generating interpolated predictive data for video decoding based on one of the fifteen sets of filter coefficients, wherein the interpolated predictive data corresponds to one of the fifteen different sub-pixel locations, and decoding one or more video blocks base on the interpolated predictive data.

In another example, this disclosure provides a method comprising defining eight sets of filter coefficients for fifteen sub-pixel positions based on coefficient symmetry and pixel symmetry, encoding video data using interpolation filters and the eight sets of filter coefficients, and outputting the eight sets of filter coefficients as part of an encoded bitstream.

In another example, this disclosure provides an apparatus comprising video decoder that receives eight sets of filter coefficients as part of an encoded video bitstream, generates fifteen sets of filter coefficients corresponding to fifteen different sub-pixel locations based on the eight sets of filter coefficients, generates interpolated predictive data for video decoding based on one of the fifteen sets of filter coefficients, wherein the interpolated predictive data corresponds to one of the fifteen different sub-pixel locations, and decodes one or more video blocks base on the interpolated predictive data.

In another example, this disclosure provides an apparatus comprising a video encoder that defines eight sets of filter coefficients for fifteen sub-pixel positions based on coefficient symmetry and pixel symmetry, encodes video data using interpolation filters and the eight sets of filter coefficients, and outputs the eight sets of filter coefficients as part of an encoded bitstream.

In another example, this disclosure provides a device comprising means for receiving eight sets of filter coefficients as part of an encoded video bitstream, means for generating fifteen sets of filter coefficients corresponding to fifteen different sub-pixel locations based on the eight sets of filter coefficients, means for generating interpolated predictive data for video decoding based on one of the fifteen sets of filter coefficients, wherein the interpolated predictive data corresponds to one of the fifteen different sub-pixel locations, and means for decoding one or more video blocks base on the interpolated predictive data.

In another example, this disclosure provides a device comprising means for defining eight sets of filter coefficients for fifteen sub-pixel positions based on coefficient symmetry and pixel symmetry, means for encoding video data using interpolation filters and the eight sets of filter coefficients, and means for outputting the eight sets of filter coefficients as part of an encoded bitstream.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that when executed by a processor cause the processor to upon receiving eight sets of filter coefficients as part of an encoded video bitstream, generate fifteen sets of filter coefficients corresponding to fifteen different sub-pixel locations based on the eight sets of filter coefficients, generate interpolated predictive data for video decoding based on one of the fifteen sets of filter coefficients, wherein the interpolated predictive data corresponds to one of the fifteen different sub-pixel locations, and decode one or more video blocks base on the interpolated predictive data.

In another example, this disclosure provides a computer-readable storage medium comprising instructions that when executed by a processor cause the processor to define eight sets of filter coefficients for fifteen sub-pixel positions based on coefficient symmetry and pixel symmetry, encode video data using interpolation filters and the eight sets of filter coefficients, and output the eight sets of filter coefficients as part of an encoded bitstream.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3 is a conceptual diagram illustrating integer-pixel positions associated with prediction data, and sub-pixel positions associated with interpolated prediction data.

FIG. 8 is a conceptual diagram illustrating six horizontal linear pixel support positions relative to a sub-pixel, with shading that shows coefficient symmetry.

FIG. 9 is a conceptual diagram illustrating six horizontal linear pixel support positions relative to a sub-pixel, with shading that shows a lack of any coefficient symmetry.

FIG. 10 is a conceptual diagram illustrating six vertical linear pixel support positions relative to a sub-pixel, with shading that shows coefficient symmetry.

FIG. 11 is a conceptual diagram illustrating six vertical linear pixel support positions relative to a sub-pixel, with shading that shows a lack of any coefficient symmetry.

FIG. 29 is an illustrative example of an array of integer-pixel filter coefficients for which prediction techniques may be used for encoding.

DETAILED DESCRIPTION

This disclosure describes filtering techniques applied by an encoder and a decoder during the prediction stage of a video encoding and/or decoding process. The described filtering techniques may enhance the accuracy of predictive data used during fractional interpolation, and in some cases, may improve predictive data of integer blocks of pixels. There are several aspects to this disclosure, including a useful twelve-pixel filter support that may be used for interpolation, techniques that use coefficient symmetry and pixel symmetry to reduce the amount of data needed to be sent between an encoder and a decoder to configure the filter support for interpolation, and techniques for filtering data at integer pixel locations in a manner that is similar to sub-pixel interpolation. These and other techniques are described in detail below.

Figure 1:
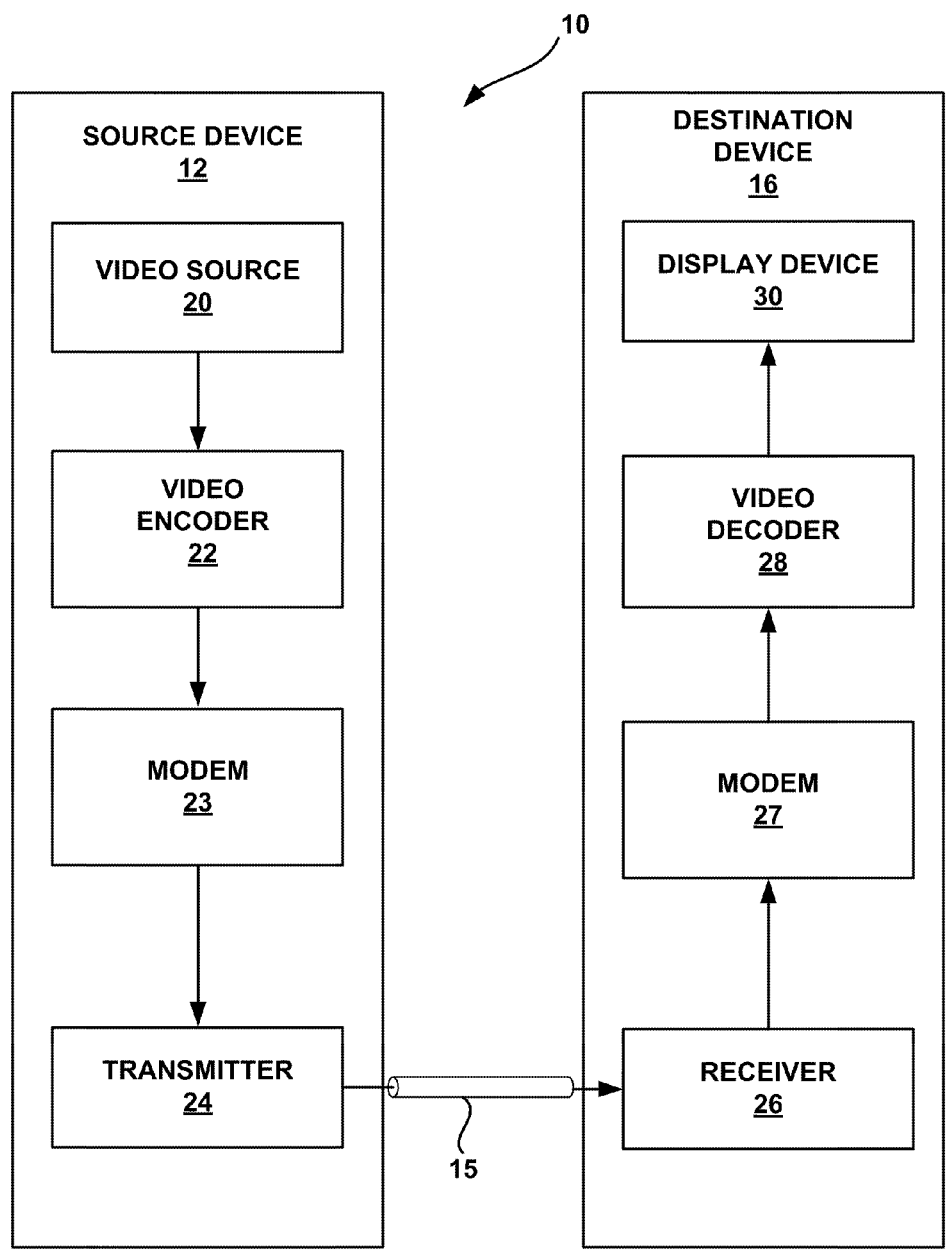
FIG. 1 is a block diagram illustrating one exemplary video encoding and decoding system that may implement techniques of this disclosure.

FIG. 1 is a block diagram illustrating one exemplary video encoding and decoding system 10 that may be used to implement one or more of the techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern filtering and the generation of predictive data during predictive coding, are not necessarily limited to wireless applications or settings. The techniques may also be useful in a wide rage of other settings and devices, including devices that communicate via physical wires, optical fibers or other physical or wireless media. In addition, the encoding or decoding techniques may also be applied in a stand alone device that does not necessarily communicate with any other device.

In the example of FIG. 1, source device 12 may include a video source 20, video encoder 22, modulator/demodulator (modem) 23 and transmitter 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Again, the illustrated system 10 of FIG. 1 is merely exemplary. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that include both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during motion compensation. The video decoding process performed by video decoder 28 may also perform such techniques during its motion compensation stage of the decoding process. The term "coder" is used herein to refer to a specialized computer device or apparatus that performs video encoding or video decoding. The term "coder" generally refers to any video encoder, video decoder, or combined encoder/decoder (codec). The term "coding"

refers to encoding or decoding. Display device 30 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular video coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, or another independently decodable unit defined according to the coding techniques used.

To encode the video blocks, video encoder 22 performs intra- or inter-prediction to generate a prediction block. Video encoder 22 subtracts the prediction blocks from the original video blocks to be encoded to generate residual blocks. Thus, the residual blocks are indicative of differences between the blocks being coded and the prediction blocks. Video encoder 22 may perform a transform on the residual blocks to generate blocks of transform coefficients. Following intra- or inter-based predictive coding and transformation techniques, video encoder 22 performs quantization. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). More details of each step of the encoding process performed by video encoder 22 will be described in more detail below in FIG. 2.

In destination device 16, video decoder 28 receives the encoded video data. Video decoder 28 entropy decodes the received video data according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 sums the prediction block with the reconstructed residual block to produce a reconstructed video block for display. More details of each step of the encoding process performed by video encoder 22 will be described in more detail below in FIG. 16.

According to the techniques of this disclosure, video encoder 22 and video decoder 28 may use the one or more interpolation filtering techniques during motion compensation. In particular, in accordance with one aspect of this disclosure, video encoder 22 and/or video decoder 28 may obtain a block of pixels, wherein the block of pixels includes integer pixel values corresponding to integer pixel positions within the block of pixels, compute sub-pixel values for sub-pixel positions associated with the block of pixels based on the integer pixel values, wherein computing the sub-pixel values comprises applying an interpolation filter that defines a two-dimensional array of filter support positions corresponding to a set of twelve or more integer pixel positions that surround the sub-pixel positions in a radial shape, and generate a prediction block based on at least some of the sub-pixel values. An example of the two-dimensional array of filter support positions corresponding to a set of twelve or more integer pixel positions is explained in greater detail below.

In accordance with another aspect of this disclosure, video encoder 22 and/or video decoder 28 may utilize aspects of symmetry in order to reduce the amount of data that needs to be communicated between source device 12 and destination device 16 for communication of filter coefficients used in interpolation. Video encoder 22 may determine eight sets of filter coefficients for fifteen different sub-pixel locations, wherein the eight sets of filter coefficients are generated based on coefficient symmetry and pixel symmetry among fifteen sub-pixel locations, and output the eight sets of filter coefficients to another device as part of an encoded bitstream. In this way, the eight sets, along with aspects of pixel symmetry and coefficients symmetry may define all of the filter coefficients for all fifteen half-pel and quarter-pel pixel positions. Moreover, pixel symmetry may exist between different ones of the fifteen sub-pixel locations in a vertical dimension and in a horizontal dimension, but pixel symmetry may not exist in a diagonal dimension for at least some of the fifteen sets sub-pixel locations. This lack of pixel symmetry in the diagonal dimension for at least some of the fifteen locations may improve interpolations and video quality in the video encoding and decoding.

Video decoder 28 of destination device 16 may receive the eight sets of filter coefficients as part of an encoded video bitstream, the generate fifteen sets of filter coefficients corresponding to fifteen different sub-pixel locations based on the eight sets of filter coefficients, generate interpolated predictive data for video decoding based on one of the fifteen sets of filter coefficients, wherein the interpolated predictive data corresponds to one of the fifteen different sub-pixel locations, and decode one or more video blocks base on the interpolated predictive data.

In accordance with another aspect of this disclosure, video encoder 22 and/or video decoder 28 may utilize interpolation-like filtering with respect to integer pixel positions in order to generate adjusted integer pixel values. Such interpolation-like filtering may improve compression specifically during illumination changes, scene fade-ins or fade-outs, may remove noise and facilitate image frame sharpening, and may help improve encoding of fine object movement between successive video frames particularly when symmetry is not imposed on filter coefficients.

The interpolation-like filtering techniques of video encoder 22 and/or video decoder 28 may include obtaining blocks of pixels, wherein the blocks of pixels includes integer pixel values corresponding to integer pixel positions within the blocks of pixels, filtering the integer pixel values based on other integer pixel values within the block of pixels to generate adjusted integer pixel values, wherein the adjusted integer pixel values correspond to the integer pixel positions, and generating a prediction block based on the adjusted integer pixel values.

In accordance with another aspect of this disclosure video encoder 22 may generate first interpolated predictive data for encoding of video data based on a first interpolation filter, generate second interpolated predictive data for video encoding of the video data based on a second interpolation filter, select between the first interpolated predictive data and the second interpolated predictive data based on a rate-distortion analysis, encode the video data based on the selection, and encode syntax to indicate the selection. The first interpolation filter may comprise a fixed interpolation filter, and the second interpolation filter may comprise an adaptive interpolation filter, but this disclosure is not necessarily limited to these examples.

Furthermore, additional interpolation filters may also be applied to generate additional interpolated predictive data, which may also be considered in the rate distortion analysis. In other words, the techniques of this disclosure are not limited to generating only first and second interpolated predictive data based on two interpolation filters, but could be applied to generate any plurality of interpolated predictive data based on any number of interpolation filters. Importantly, a rate-distortion analysis interpolated predictive data is used to identify which filter to select.

In one example, a method may comprise generating a plurality of different versions of predictive data for encoding of video data based on a plurality of different interpolation filters, selecting among the plurality of different versions of predictive data based on a rate distortion analysis, encoding the video data based on the selection, and encoding syntax to indicate the selection.

This disclosure also contemplates technique for encoding filter coefficients. For example, video encoder 22 may identify a set of filter coefficients for interpolation of predictive data in video encoding, generate residual values associated with the set of filter coefficients based on predictive coding of the set of filter coefficients relative to filter coefficients associated with a fixed interpolation filter, apply quantization to the residual values, and output the quantized residual values as part of an encoded bitstream.

Video decoder 28 may receive residual values associated with a set of filter coefficients, generate the set of filter coefficients using predictive decoding based on the set of residual values and filter coefficients associated with a fixed interpolation filter, and apply the set of filter coefficients to interpolate predictive data used for predictive decoding of video blocks.

Figure 2:
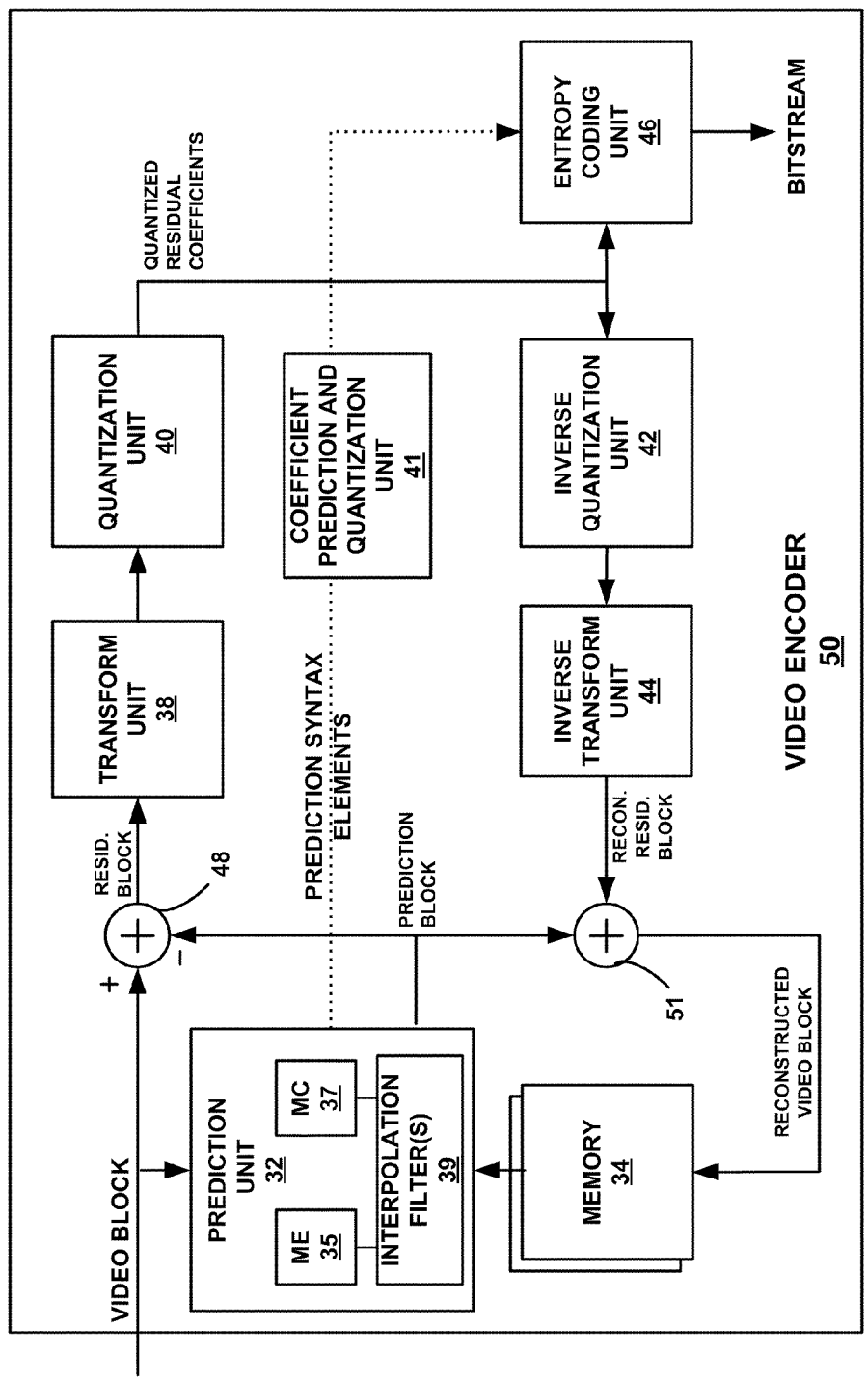
FIG. 2 is a block diagram illustrating an example of a video encoder that may perform filtering techniques consistent with this disclosure.

FIG. 2 is a block diagram illustrating an example of a video encoder 50 that may perform filtering techniques consistent with this disclosure. Video encoder 50 is one example of a specialized video computer device or apparatus referred to herein as a "coder." Video encoder 50 may correspond to video encoder 22 of device 20, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode, and Inter-modes such as a prediction (P-mode) or a bi-directional (B-mode) may refer to the temporal based compression modes. The techniques of this disclosure apply during inter-coding, and therefore, intra-coding units such as spatial prediction unit are not illustrated in FIG. 2 for simplicity and ease of illustration.

As shown in FIG. 2, video encoder 50 receives a video block within a video frame to be encoded. In the example of FIG. 2, video encoder 50 includes a prediction unit 32, memory 34, an adder 48, a transform unit 38, a quantization unit 40, and an entropy coding unit 46. For video block reconstruction, video encoder 50 also includes an inverse quantization unit 42, an inverse transform unit 44, and an adder 51. A deblocking filter (not shown) may also be included to filter block boundaries to remove blockiness artifacts from reconstructed video. If desired, the deblocking filter would typically filter the output of adder 51.

Prediction unit 32 may include a motion estimation (ME) unit 35, and a motion compensation (MC) unit 37. Filter 37 may be included in prediction unit 32 and may be invoked by one or both of ME unit 35 and MC unit 37 to perform interpolation or interpolation-like filtering as part of motion estimation and/or motion compensation, according to this disclosure. Filter 37 may actually represent a plurality of different filters to facilitate numerous different types of interpolation and interpolation-type filtering as described herein. Thus, prediction unit 32 may include a plurality of interpolation or interpolation-like filters. During the encoding process, video encoder 50 receives a video block to be coded (labeled "VIDEO BLOCK" in FIG. 2), and prediction unit 32 performs inter-prediction coding to generate a prediction block (labeled "PRED. BLOCK" in FIG. 2). Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The reference frame (or portion of the frame) may be temporally located prior to or after the video frame (or portion of the video frame) to which the current video block belongs. Motion compensation is typically considered the process of fetching or generating the prediction block from memory 34, or possibly interpolating or otherwise generating filtered predictive data based on the motion vector determined by motion estimation.

ME unit 35 selects the appropriate motion vector for the video block to be coded by comparing the video block to video blocks of one or more reference frames (e.g., a previous and/or subsequent frame). ME unit 35 may perform motion estimation with fractional pixel precision, sometimes referred to as fractional pixel, fractional pel, or sub-pixel motion estimation. As such, the terms fractional pixel, fractional pel, and sub-pixel motion estimation may be used interchangeably. In fractional pixel motion estimation, ME unit 35 may select a motion vector that indicates displacement to a location other than an integer pixel location. In this manner, fractional pixel motion estimation allows prediction unit 32 to track motion with higher precision than integer-pixel (or full-pixel) locations, thus generate a more accurate prediction block. Fractional pixel motion estimation may have half-pixel precision, quarter-pixel precision, eighth-pixel precision or any finer precision. ME unit 35 may invoke filter(s) 39 for any necessary interpolations during the motion estimation process.

To perform fractional pixel motion compensation, MC unit 37 may perform interpolation (sometimes referred to as interpolation filtering) in order to generate data at sub-pixel resolution (referred to herein as sub-pixel or fractional pixel values). MC unit 37 may invoke filter(s) 39 for this interpolation. Prediction unit 32 may perform the interpolation (or interpolation-like filtering of integer pixels) using the techniques described herein.

Once the motion vector for the video block to be coded is selected by ME unit 35, MC unit 37 generates the prediction video block associated with that motion vector. MC unit 37 may fetch the prediction block from memory 34 based on the motion vector determined by MC unit 35. In the case of a motion vector with fractional pixel precision, MC unit 37 filters data from memory 34 to interpolate such data to sub-pixel resolution, e.g., invoking filter(s) 39 for this process. In some cases, the interpolation filtering technique or mode that was used to generate the sub-pixel prediction data may be indicated as one or more interpolation syntax elements to entropy coding unit 46 for inclusion in the coded bitstream. Indeed, some aspects of this disclosure concern the use of pixel symmetry and coefficient symmetry to reduce the amount of syntax that needs to be conveyed.

Once prediction unit 32 has generated the prediction block, video encoder 50 forms a residual video block (labeled "RESID. BLOCK" in FIG. 2) by subtracting the prediction block from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. Following quantization, entropy coding unit 46 entropy codes the quantized transform coefficients. For example, entropy coding unit 46 may perform CAVLC, CABAC, or another entropy coding methodology.

Entropy coding unit 46 may also code one or more prediction syntax elements obtained from prediction unit 32 or other component of video encoder 50. The one or more prediction syntax elements may include a coding mode, one or more motion vectors, an interpolation technique that was use to generate the sub-pixel data, a set or subset of filter coefficients, or other information associated with the generation of the prediction block. Coefficient prediction and quantization unit 41 may predictively encode and quantize the prediction syntax, such as filter coefficients, according to some aspects of this disclosure. Following the entropy coding by entropy coding unit 46, the encoded video and syntax elements may be transmitted to another device or archived for later transmission or retrieval.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by summer 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block in a subsequent video frame or subsequent coded unit.

As described above, prediction unit 32 may perform motion estimation with fractional pixel (or sub-pixel) precision. When prediction unit 32 uses fractional pixel motion estimation, prediction unit 32 may generate data at sub-pixel resolution (e.g., sub-pixel or fractional pixel values) using interpolation operations described in this disclosure. In other words, the interpolation operations are used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

FIG. 3 is a conceptual diagram illustrating integer pixel (or full pixel) positions associated with prediction data, and sub-pixel (or fractional-pixel) positions associated with interpolated prediction data. In the conceptual illustration of FIG. 3, the different boxes represent pixel and sub-pixel locations or positions within a frame or a block of a frame. Capitalized letters (in the boxes with solid lines) represent integer-pixel locations, while small letters (in the boxes with dotted lines) represent the sub-pixel locations. In particular, pixel locations A1-A6, B1-B6, C1-C6, D1-D6, E1-E6 and F1-F6 represent a 6-by-6 array of integer pixel locations within a frame, slice or other coded unit. Sub-pixel locations "a" through "o" represent fifteen sub-pixel locations associated with integer pixel C3, e.g., between integer pixel locations C3, C4, D3 and D4. Similar sub-pixel locations may exist for every integer pixel location. The sub-pixel locations "a" through "o" represent every half-pel and quarter-pel pixel location associated with integer pixel C3.

Integer-pixel locations may be associated with a physical sensor element, such as a photodiode when the video data was originally generated. The photodiode may measure an intensity of a light source at the location of the sensor and associate a pixel intensity value with the integer-pixel location. Again, each integer-pixel location may have an associated set of fifteen sub-pixel locations (or possibly more). The number of sub-pixel locations associated with integer-pixel locations may be dependent upon the desired precision. In the example illustrated in FIG. 3, the desired precision is quarter-pixel precision, in which case, each of the integer pixel locations corresponds with fifteen different sub-pixel positions. More or fewer sub-pixel positions may be associated with each integer-pixel location based on the desired precision. For half-pixel precision, for example, each integer-pixel location may correspond with three sub-pixel positions. As another example, each of the integer-pixel locations may correspond with sixty-three sub-pixel positions for eighth-pixel precision. Each pixel location may define one or more pixel values, e.g., one or more luminance and chrominance values.

Y may represent luminance, and Cb and Cr may represent two different values of chrominance of a three-dimensional YCbCr color space. Each pixel location may actually define three pixel values for a three-dimensional color space. The techniques of this disclosure, however, may refer to prediction with respect to one dimension for purposes of simplicity. To the extent that techniques are described with respect to pixel values in one dimension, similar techniques may be extended to the other dimensions.

In the example of FIG. 3, sub-pixel locations associated with integer pixel "C3" are illustrated for quarter-pixel precision. The fifteen sub-pixel positions associated with pixel C3 are labeled as "a," "b," "c," "e," "f," "g," "h," "i," "j," "k," "l," "m," "n," and "o." Most of the other fractional locations associated with other integer-pixel locations are not shown for simplicity (other than those used to generate one or more of the 15 different fractional locations associated with pixel location C3, as described in further detail below). Sub-pixel locations "b," "h" and "j" may be referred to as half-pixel locations and sub-pixel locations "a," "c," "d," "e," "f," "g," "i," "k," "l," "m," and "o" may be referred to as quarter-pixel locations.

Prediction unit 32 of video encoder 40 may determine pixel values for sub-pixel locations "a" through "o" using interpolation filtering by MC unit 37. Consistent with the ITU-T H.264 standard, for example, prediction unit 32 may determine pixel values for half-pixel locations using a 6-tap interpolation filter, such as a Wiener filter. In the case of the H.264 standard, the filter coefficients for the 6-tap interpolation filter are typically [1, −5, 20, 20, −5, 1], although other coefficients may be used. Prediction unit 32 may apply the interpolation filter first in the horizontal direction and then in the vertical direction, or vice versa. For half-pixel positions "b" and "h," each tap may correspond to an integer pixel position in the horizontal and vertical direction, respectively. In particular, for half-pixel position "b," the taps of the 6-tap filter correspond to C1, C2, C3, C4, C5 and C6. Likewise, for half-pixel position "h," the taps of the 6-tap filter correspond to A3, B3, C3, D3, E3 and F3. For example, pixel values for sub-pixel positions "b" and "h" may be computed using equations (1) and (2):

$$b=((C1-5*C2+20*C3+20*C4-5*C5+C6)+16)/32 \quad (1)$$

$$h=((A3-5*B3+20*C3+20*D3-5*E3+F3)+16)/32 \quad (2)$$

For half-pixel position "j," the taps of the 6-tap filter correspond themselves to interpolated horizontally between positions C1-C6 and D1-D6, or vertically between positions A3-F3 and A4-F4. Half-pixel location "j" may be computed with a 6-tap filter that uses previously interpolated pixel values of the half-pixel positions, e.g., in accordance with one of equations (3) or (4):

$$j=((aa-5*bb+20*b+20*hh-5*ii+jj)+16)/32 \quad (3)$$

$$j=((cc-5*dd+20*h+20*ee-5*ff+gg)+16)/32 \quad (4)$$

where (as illustrated in FIG. 3) aa corresponds to an interpolation between A3 and A4, bb corresponds to an interpolation between B3 and B4, b corresponds to an interpolation between C3 and C4, hh corresponds to an interpolation between D3 and D4, ii corresponds to an interpolation between E3 and E4 and jj corresponds to an interpolation between F3 and F4. In equation 4, cc corresponds to an interpolation between C1 and D1, dd corresponds to an interpolation between C2 and D2, h corresponds to an interpolation between C3 and D3, ee corresponds to an interpolation between C4 and D4, ff corresponds to an interpolation between C5 and D5 and gg corresponds to an interpolation between C6 and D6.

Consistent with the H.264 standard, prediction unit 32 may determine pixel values at quarter-pixel locations "a," "c," "d," "e," "f," "g," "i," "k," "l," "m," "n," and "o" using a bilinear interpolation filter and the pixel values of the surrounding integer- and half-pixel locations. For example, prediction unit 32 may determine a pixel value associated with sub-pixel position "a" using pixel values of C3 and "b," determine a pixel value associated with sub-pixel position "c" using pixel values of "b" and C4, and the like.

The actual filter that is applied by MC unit 37 to generate interpolated data at the sub-pixel locations may be subject to a wide variety of implementations. As one example, prediction unit 32 may use adaptive interpolation filtering (AIF), as described below, to define the interpolated values. The ITU-T SG16/Q.6/VCEG (Video Coding Expert Group) committee has been exploring coding technologies that offer higher coding efficiency than H.264 and, in particular, AIF. AIF offers large coding gain over the interpolation filtering used in the H.264 standard, especially on video sequences with high resolution (e.g., 720 i/p or 1080 i/p). In AIF, the interpolation filter for each sub-pixel position is analytically calculated for each video frame by minimizing the prediction error energy. This helps to address aliasing, quantization and motion estimation errors, camera noise or other artifact contained in the original and reference video frames. The analytically derived adaptive filter coefficients for each frame are then predicted, quantized, coded and sent in the video bitstream. Some of the techniques of this disclosure could work within an AIF scheme, as well as many other interpolation schemes.

There are many different types of AIF schemes consistent with aspects of this disclosure. For example a first scheme is a two-dimensional non-separable AIF (NS-AIF), a second is a separable AIF (S-AIF), and a third is an AIF with directional filters (D-AIF). Although each of these AIF schemes use different interpolation techniques and support, all three AIF schemes may use similar analytical processes to derive the filter coefficients, which is explained below using non-separable AIF as an example.

Assume a 6-by-6 two-dimensional non-separable filter has coefficients $h_{i,j}^{SP}$ where i,j=0 . . . 5 and SP represents one of the 15 sub-pixel positions ("a" through "o") shown in FIG. 3. Note that 6 of the 15 sub-pixel positions, i.e., "a," "b," "c," "d," "h" and "l," are one-dimensional (1D) sub-pixel positions, and prediction unit 32 may use a 6-tap interpolation filter to interpolate such data. Sub-pixel positions "a," "b," "c," "d," "h" and "l," are 1D in the sense that they are located in a horizontal or vertical line between two integer-pixel positions. Also, assume that the prediction pixels at the integer-pixel positions (A1 through F6 in FIG. 3) in the reference frame take the pixel values of $P_{i,j}$ where i,j=0 . . . 5. That is, A1 takes the value of $P_{0,0}$, . . . , A6 takes the value of $P_{5,0}$, . . . , F1 takes the value of $P_{5,0}$, . . . , and F6 takes the value of $P_{5,5}$. Then, the interpolated value $p^{SP}$ at sub-pixel position SP, SP∈{a, . . . , o}, may be calculated by prediction unit 32 using the following equation $$p^{SP} = \sum_{i=0}^{5}\sum_{j=0}^{5} P_{i,j} h_{i,j}^{SP}. \quad (5)$$

Let $S_{x,y}$ be the pixel value in the current video frame at position (x, y).

$$\tilde{x}=x+\lfloor mvx \rfloor - FO, \tilde{y}=y+\lfloor mvy \rfloor - FO, \quad (40)$$

where (mvx,mvy) is the motion vector, ($\lfloor mvx \rfloor$,$\lfloor mvy \rfloor$) is the integer component of the motion vector, and FO is the filter offset. The value ($\tilde{x}$, $\tilde{y}$) is the corresponding pixel position in the reference frames. For example, in the case of 6-tap filter, FO=6/2−1=2. For each sub-pixel position SP, the prediction error energy $(e^{SP})^2$ between the actual pixel value in the current frame and the interpolated value can be accumulated by prediction unit 32 for all pixels that have motion vector precision corresponding to sub-pixel position SP. The prediction error energy $(e^{SP})^2$ may be calculated by prediction unit 32 using the following equation:

$$(e^{SP})^2 = \sum_x \sum_y (S_{x,y} - p_{x,y}^{SP})^2 = \sum_x \sum_y \left( S_{x,y} - \sum_{i=0}^{5}\sum_{j=0}^{5} h_{i,j}^{SP} P_{\tilde{x}+i,\tilde{y}+j} \right)^2 \quad (6)$$

For each of the sub-pixel positions a through o, MC unit 37 may set up an individual set of equations by computing the derivative of $(e^{SP})^2$ with respect to the filter coefficients $h_{i,j}^{SP}$. The number of equations, in this case, is equal to the number of filter coefficients used for the current sub-pixel position SP. For each two-dimensional (2D) sub-pixel position "e," "f," "g," "i," "j," "k," "m," "n," and "o," prediction unit 32 may use a 6-by-6 tap 2D interpolation filter. Sub-pixel positions "e," "f," "g," "i," "j," "k," "m," "n," and "o," are 2D in the sense that they are not located in a vertical line or horizontal line between two integer-pixel positions. In this case, a system of thirty-six equations with thirty-six unknowns can be solved by MC unit 37. The remaining 1D sub-pixel positions "a," "b," "c," "d," "h," and "l" may only require a 1D interpolation filter (e.g., 1D 6-tap filter). In the case of a 1D 6-tap filter, a system of six equations can be solved by MC unit 37.

$$0 = \frac{(\partial e^{SP})^2}{\partial h_{k,l}^{SP}} \quad (7)$$

$$= \frac{\partial}{\partial h_{k,l}^{SP}} \left( \sum_x \sum_y \left( S_{x,y} - \sum_i \sum_j h_{i,j}^{SP} P_{\tilde{x}+i,\tilde{y}+j} \right)^2 \right)$$

$$= \sum_x \sum_y \left( S_{x,y} - \sum_i \sum_j h_{i,j}^{SP} P_{\tilde{x}+i,\tilde{y}+j} \right) P_{\tilde{x}+k,\tilde{y}+l}$$

$$\forall k, l \in \{0; 5\}$$

Filter(s) 39 may represent one filter or a set of many different filters that may be used by MC unit 37 to generate the predictive data.

Thus, one example process of deriving and applying the AIF filters may have the following steps, which can be performed by prediction unit 32:
1. Estimate motion vectors (mvx,mvy) for every video block to be coded. During motion estimation, a fixed interpolation filter (e.g., the interpolation process of H.264/AVC) can be applied.
2. Using these motion vectors, accumulate prediction error energy for each sub-pixel position SP over the current video frame. Then, calculate adaptive filter coefficients $h_{i,j}^{SP}$ for each sub-pixel position SP independently by minimizing the prediction error energy as in the two prediction energy equations above.
3. Estimate new motion vectors. During this motion estimation process, the adaptive interpolation filters computed in step 2 may be applied. Using the adaptive interpolation filters, motion estimation errors, caused by aliasing, camera noise, etc., are reduced and better motion prediction is achieved.

Different AIF schemes may use the same analytical process as given above. The differences between the different schemes mostly lie in the number of unique filter coefficients used, whether the interpolation filters are separable or non-separable, and the filter support used (i.e., integer pixel positions used to interpolate at least a portion of the sub-pixel positions). In each of these schemes, certain symmetry constraints on the AIF filters may be imposed to reduce the number of filter coefficients that need to be encoded and sent in the video bitstream.

For NS-AIF, for example, MC unit 37 of prediction unit 32 may interpolate 1D sub-pixel positions "a," "b," "c," "d," "h," and "l" using a 1D 6-tap interpolation filter (also referred to as a 6-position filter as each tap corresponds with a integer-pixel position), which requires six coefficients. The six coefficients of the 6-position filters used to interpolate the 1D sub-pixel each correspond with one of the integer-pixel positions illustrated in FIG. 3. For example, for sub-pixel positions "a," "b," and "c," the six integer-pixel positions corresponding to the coefficients are C1, C2, C3, C4, C5 and C6 and for sub-pixel positions "d," "h," and "l," the six integer-pixel positions corresponding to the coefficients are A3, B3, C3, D3, E3 and F3. These integer-pixel positions represent the "filter support" of the interpolation filter.

Prediction unit 32 may interpolate 2D sub-pixel positions "e," "f," "g," "i," "j," "k," "m," "n," and "o" using a 2D 6-by-6 interpolation filter, which requires thirty-six filter coefficients. The thirty-six coefficients of the 2D 6×6 interpolation filter used to interpolate the 2D sub-pixel each correspond with integer-pixel positions A1-A6, B1-B6, C1-C6, D1-D6, E1-E6 and F1-F6. These integer-pixel positions represent the "filter support" of the interpolation filter. If no additional restriction is imposed, e.g., no coefficient or pixel symmetry, video encoder 50 may encode and transmit nine sets of thirty-six coefficients for the 2D sub-pixel positions and six sets of six coefficients for the 1D sub-pixel positions, for a total of 360 coefficients. Encoding and sending that number of coefficients in the video bitstream may result in costly bit overhead. The high bit overhead may, in turn, increase the bit rate for a given level of distortion, which is undesirable.

To reduce the bit overhead associated with sending the filter coefficients, certain symmetry restrictions may be imposed on the interpolation filters to reduce the number of unique filter coefficients that need to be sent to decoder 28. Two types of symmetry, i.e., pixel symmetry and coefficient symmetry may be imposed, alone or in combination. Pixel symmetry enforces the same set of filter coefficients (and the mirrored, flipped and/or rotated versions of the set) for different sub-pixel positions. Pixel symmetry may also be referred to as sub-pixel symmetry insofar as such pixel symmetry applies with respect to the filter coefficients associated with two or more sub-pixel locations. Coefficient symmetry, on the other hand, enforces a given interpolation filter to be symmetric in a certain direction (e.g., horizontal direction, vertical direction or both) for the various filter support positions relative to other filter support positions for a given sub-pixel values to be interpolated.

Pixel symmetry may be used in NS-AIF. Referring again to FIG. 3, let $h_0^a, h_1^a, \ldots, h_5^a$ be the set of filter coefficients for sub-pixel position "a," then the set of filter coefficients for sub-pixel position "c" is $h_5^a, h_4^a, \ldots, h_0^a$, i.e., the same coefficient in reverse order or horizontally flipped. That is, prediction pixel value $p^a$ at sub-pixel position "a" and prediction pixel value $p^c$ at sub-pixel position "c" may be calculated using (8) and (9), respectively.

$$p^a = h_0^a \cdot C_1 + h_1^a \cdot C_2 + h_2^a \cdot C_3 + h_3^a \cdot C_4 + h_4^a \cdot C_5 h_5^a \cdot C_6 \quad (8)$$

$$p^c = h_5^a \cdot C_1 + h_4^a \cdot C_2 + h_3^a \cdot C_3 + h_2^a \cdot C_4 + h_1^a C_5 + h_0^a \cdot C_6 \quad (9)$$

Sub-pixel positions "d" and "l" may be interpolated using the same set of interpolation filter coefficients as sub-pixel positions "a" and "c," respectively. As such, sub-pixel positions "a" and "c" may have pixel symmetry relative to sub-pixel positions "d" and "l."

One aspect of this disclose is to actually remove pixel symmetry between sub-pixel positions "a" and "c" relative to sub-pixel positions "d" and "l." In addition, pixel symmetry may be avoided for sub-pixel position "f" relative to sub-pixel position "i." In addition, pixel symmetry may be avoided for sub-pixel position "k" relative to sub-pixel position "n." In such cases, diagonal correlation may be low, making it inefficient or ineffective to impose diagonal symmetry in these cases.

As another example, let $h_{0,0}^e, h_{0,1}^e, \ldots, h_{5,0}^e, h_{5,1}^e, \ldots, h_{5,5}^e$ be the set of 6-by-6 2D filter coefficients for sub-pixel position "e." Then the set of filter coefficients for position "g" is $h_{0,5}^e, h_{0,4}^e, \ldots, h_{0,0}^e, \ldots, h_{5,5}^e, h_{5,4}^e, \ldots, h_{5,0}^e$ (horizontally flipped version). Similarly, the set of filter coefficients for sub-pixel position "m" is $h_{5,0}^e, h_{5,1}^e, \ldots, h_{5,5}^e, \ldots, h_{0,0}^e, h_{0,1}^e, \ldots, h_{0,5}^e$ (vertically flipped version), and the set of filter coefficients for sub-pixel position "o" is $h_{5,5}^e, h_{5,4}^e, \ldots,$ $h_{5,0}^e, \ldots, h_{0,5}^e, h_{0,4}^e, \ldots, h_{0,0}^e$ (first horizontally flipped a such, sub-pixel positions "e," "g," "m" and "o" have pixel symmetry. Symmetry between sub-pixel positions "b" and "h," and between positions "f," "i," "k," and "n" are imposed in a similar fashion as the examples given above. Under such a pixel symmetry constraint, there remain only five groups of unique filter sets, a first set of filter coefficients for sub-pixel group "a," "c," "d" and "l," a second set of filter coefficients for sub-pixel group "b" and "h," a third set of filter coefficients for sub-pixel group "e," "g," "m" and "o," a fourth set of filter coefficients for group "f," "i," "k," and "n," and a fifth set of filter coefficients for sub-pixel group "j."

Furthermore, NS-AIF may impose coefficient symmetry restriction on some of these filter sets, alone or in combination with the sub-pixel symmetry described above. In some cases, diagonal coefficient symmetry may be purposely avoided, e.g., eliminating any diagonal coefficient symmetry constraints. In one instance, no coefficient symmetry is imposed on filter for the first group of sub-pixel positions, which includes sub-pixel locations "a," "c," "d" and "l." However, the second group of sub-pixel positions, which includes coefficient "b" and "h," may have coefficient symmetry in accordance with equation (10).

$$h_0^b = h_5^b, h_1^b = h_4^b, h_2^b = h_3^b \quad (10)$$

Likewise, the coefficients for interpolation filters for the third, fourth and fifth groups of sub-pixel positions, which include sub-pixel positions "e," "f," and "j," respectively, may have coefficient symmetry as given in equations (11), (12), and (13), respectively.

$$h_{i,j}^e = h_{j,i}^e, \text{ for } i,j=0\ldots5, i \neq j \quad (11)$$

$$h_{i,j}^f = h_{i,5-j}^f, \text{ for } i,j=0\ldots5 \quad (12)$$

$$h_{i,j}^j = h_{i,5-j}^j = h_{5-i,j}^j = h_{5-i,5-j}^j$$

$$h_{i,j}^j = h_{j,i}^j, \text{ for } i,j=0\ldots2\ i \neq j \quad (13)$$

Under such pixel symmetry and coefficient symmetry constraints described above, the number of unique filter coefficients can be reduced from 360 (no symmetry constraint) to 6(a)+3(b)+21(e)+18(f)+6(j)=54 coefficients, i.e., 6 coefficients for the group including sub-pixel position "a," 3 coefficients for the group including sub-pixel position "b," 21 coefficients for the group including sub-pixel position "e," 18 coefficients for the group including sub-pixel position "f," and 6 coefficients for the group including sub-pixel position "j." Thus, in NS-AIF, video encoder 22 may encode and transmits fifty-four coefficients instead of 360, as in the case of no symmetry constraints. As described above, the fifty-four coefficients may be analytically solved based on equation (7) above. Video encoder 50 may then predict, quantize, code (e.g, using signed Exp-Golomb code), and send the coefficients in the bitstream. Additional details on the predictive coding of filter coefficients is discussed in greater detail below. Coefficient prediction and quantization unit 41 may be used for the predictive coding and quantization of filter coefficients consistent with this disclosure.

In another AIF scheme, i.e., S-AIF, prediction unit 32 may use separable interpolation filters in the horizontal direction and in the vertical direction, instead of non-separable interpolation filters as used in NS-AIF. For the 1D sub-pixel positions, prediction unit 32 (e.g., MC unit 37 of prediction unit 32) applies only horizontal directional filters or only vertical directional filters depending on the sub-pixel location. In one example, the horizontal and vertical directional filters comprise 6-position (or 6-tap) filters. Prediction unit 32 applies horizontal directional filters for sub-pixel positions "a," "b,"

and "c" with integer-pixel positions C1, C2, C3, C4, C5, and C6 (see FIG. 3) as filter support and applies vertical directional filters for sub-pixel positions "d," "h," and "l" with integer-pixel positions A3, B3, C3, D3, E3 and F3 (see FIG. 3) as filter support. For the remaining sub-pixel positions, i.e., the 2D sub-pixel positions, prediction unit 32 applies horizontal filtering first, followed by vertical filtering or vertical filtering, followed by horizontal filtering. Again, the filter coefficients used for the separable horizontal and vertical filters may be computed in accordance with equation (7) above. Without any symmetry, S-AIF may reduce the number of coefficients that need to be coded and sent to 144 coefficients from 360 coefficients, as is the case of NS-AIF with no symmetry.

S-AIF may further impose one or more symmetry restrictions on at least some of the interpolation filters. Unlike the sub-pixel symmetry of NS-AIF, with S-AIF, the filter sets used for sub-pixel positions "a" and "c" are not symmetric, i.e., horizontally flipped versions of each other. Instead, the coefficients of the filter sets used for sub-pixel positions "a" and "c" are derived independently of one another as $h_0^a$, $h_1^a, \ldots, h_5^a$ and $h_0^e, h_1^e, \ldots, h_5^e$, respectively. For each sub-pixel position that has vertical movement, the sub-pixel symmetry is similar to NS-AIF. That is, coefficients for sub-pixel positions "d" and "l," coefficients for sub-pixel positions "e" and "m," coefficients for sub-pixel positions "f" and "n," and coefficients for sub-pixel positions "g" and "o" are vertically flipped versions of each other, respectively. For example, if the coefficients of the vertical filter for sub-pixel pixel position "d" is $h_0^d, h_1^d, \ldots, h_5^d$, then the coefficients of the vertical filter for sub-pixel position "l" is $h_5^d, h_4^d, \ldots, h_0^d$. Thus, the sub-pixel symmetry used in S-AIF only has vertical sub-pixel symmetry in one dimension. S-AIF does not, however, have horizontal sub-pixel symmetry. The sub-pixel symmetry in S-AIF may reduce the number of coefficients that need to be encoded and sent from 144 coefficients to 102 coefficients.

S-AIF, like NS-AIF, may also use coefficient symmetry to further reduce the number of coefficients that need to be encoded and sent by video encoder 50. The coefficient symmetry used in S-AIF may be the same as in NS-AIF, except that in S-AIF there are only 1D (horizontal or vertical) 6-tap filters. In other words, there are no 6-by-6 2D filters. In S-AIF, for each sub-pixel position SP, SP$\in$\{b, h, i, j, k\}, the filter coefficients may have symmetry as indicated in equation (14).

$$h_0^{SP}=h_5^{SP}, h_1^{SP}=h_4^{SP}, h_2^{SP}=h_3^{SP} \quad (14)$$

Therefore, with both sub-pixel symmetry and coefficient symmetry, S-AIF filters may have eleven sets of unique 1D 6-tap filters, five of which are symmetric filters that each have three unique coefficients. The remaining six filters may each have six unique coefficients. In this case, video encoder 22 may quantize, predict, code, and send a total of fifty-one unique filter coefficients in the video bitstream.

In another AIF scheme, D-AIF, prediction unit 32 uses directional filters for the 2D sub-pixel positions "e," "f," "g," "i," "j," "k," "m," "n," and "o." The directional filters may comprise six tap filters, and coefficients may have symmetry so that only a subset of the coefficients needs to be transmitted. As described herein, filter support refers to the pixel positions from the reference frame that is used in interpolating the sub-pixel positions. MC unit 37 may compute sub-pixel positions "e" and "o" with a 6-position (or 6-tap) diagonal interpolation filter that has integer pixel positions A1, B2, C3, D4, E5 and F6 as filter support. Prediction unit 32 may compute sub-pixel positions "g" and "m" with a 6-position diagonal interpolation filter that has integer pixel positions A6, B5, C4, D3, E2 and F1 as filter support. Prediction unit 32 may compute sub-pixel positions "f," "i," "j," "k" and "n" with a 12-position diagonal interpolation filter that has integer pixel positions A1, B2, C3, D4, E5, F6, A6, B5, C4, D3, E2 and F1 as filter support.

D-AIF may use the same sub-pixel and coefficient symmetry as described above with respect to NS-AIF. In terms of sub-pixel symmetry, there are five unique sets of filter coefficients for interpolating the fifteen sub-pixel positions with sub-pixel positions "a," "c," "d" and "l" sharing the same filter coefficients (e.g., mirrored, flipped and/or rotated versions), sub-pixel positions "e," "g," "m" and "o" sharing the same filter coefficients (e.g., mirrored, flipped and/or rotated versions), sub-pixel positions "b" and "h" sharing the same filter coefficients ("b" being a horizontal filter and "h" being a vertical filter), sub-pixel positions "f," "i," "k," and "n" sharing the same filter coefficients (e.g., mirrored, flipped and/or rotated versions), and sub-pixel position "j" has its own set of filter coefficients.

In terms of coefficient symmetry, filter coefficients for the first sub-pixel group including "a," "c," "d" and "l," uses a 1D 6-position filter having six unique coefficients (i.e., the first group being non-symmetric), filter coefficients for the second sub-pixel group "b" and "h" uses a 1D 6-position filter having three unique coefficients, (i.e., b is symmetric), and a third set of filter coefficients for sub-pixel group "e," "g," "m" and "o" uses a directional 6-position filter having six unique coefficients. A fourth set of filter coefficients for group "f," "i," "k," and "n" use a 12-tap filter having 6 unique coefficients and a fifth set of filter coefficients for group "j" having three unique coefficients. The total number of unique coefficients in the D-AIF scheme is 6(a)+3(b)+6(e)+6(f)+3(j)=24 coefficients. These filter coefficients may be predicted, quantized, coded, and sent in the video bitstream.

MC unit 37 of prediction unit 32 may use one or more of the interpolation techniques described herein to enhance the accuracy of interpolation of sub-pixel positions and/or reduce the number of interpolation filter coefficients that need to be encoded and transmitted. Described in greater detail below is a useful twelve-pixel filter support with a radial shape that may be used for interpolation, techniques that use coefficient symmetry and pixel symmetry to reduce the amount of data needed to be sent between an encoder and a decoder to configure the filter support for interpolation, techniques for removing some aspects of symmetry relative to conventional techniques, and techniques for filtering data at integer pixel locations in a manner that is similar to sub-pixel interpolation. Offset techniques are also described. In addition, techniques for selecting between interpolation filters, and techniques for predictively encoding filter coefficients are also described.

Figure 4:
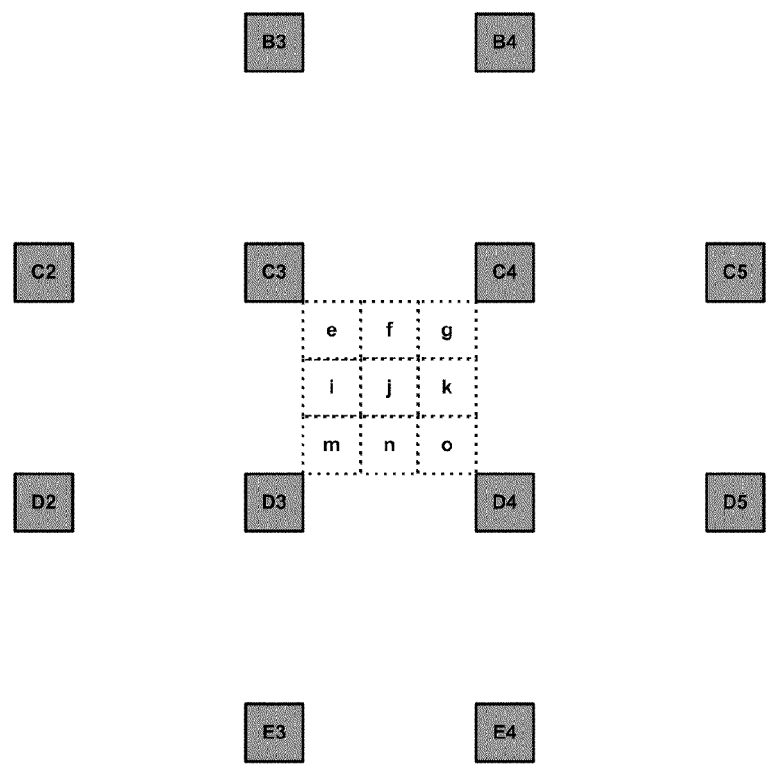
FIG. 4 is a conceptual diagram illustrating a 12 pixel filter support with respect to nine sub-pixel locations.

FIG. 4 is a conceptual diagram illustrating a twelve pixel filter support with respect to nine sub-pixel locations. In accordance with this disclosure, MC unit 37 may compute sub-pixel values for sub-pixel positions "e," "f," "g," "i," "j," "k," "m," "n," and "o" based on the shaded integer pixel values. In this case, computing the sub-pixel values comprises applying an interpolation filter that defines a two-dimensional array of filter support positions corresponding to a set of twelve (or possibly more) integer pixel positions that surround the sub-pixel positions as illustrated in FIG. 4. The filter support positions are shown with shading and capitalized lettering, and the sub-pixel positions are shown as boxes with dotted lines and lower case lettering. MC unit 37 may interpolate pixels in this manner for every pixel of a video block, and may generate a prediction block based on interpolated the sub-pixel values. The 12 position filter support has a radial shape, and has similar frequency response as the 36 position filter support used in NS-AIF but with much reduced interpolation complexity.

As can be appreciated from FIG. 3, the sub-pixel values may comprise fifteen half-pel and quarter-pel values. The interpolation filter that defines the two-dimensional array of filter support positions is applied to define nine of the fifteen half-pel and quarter-pel values as shown in FIG. 4.

Figure 16:
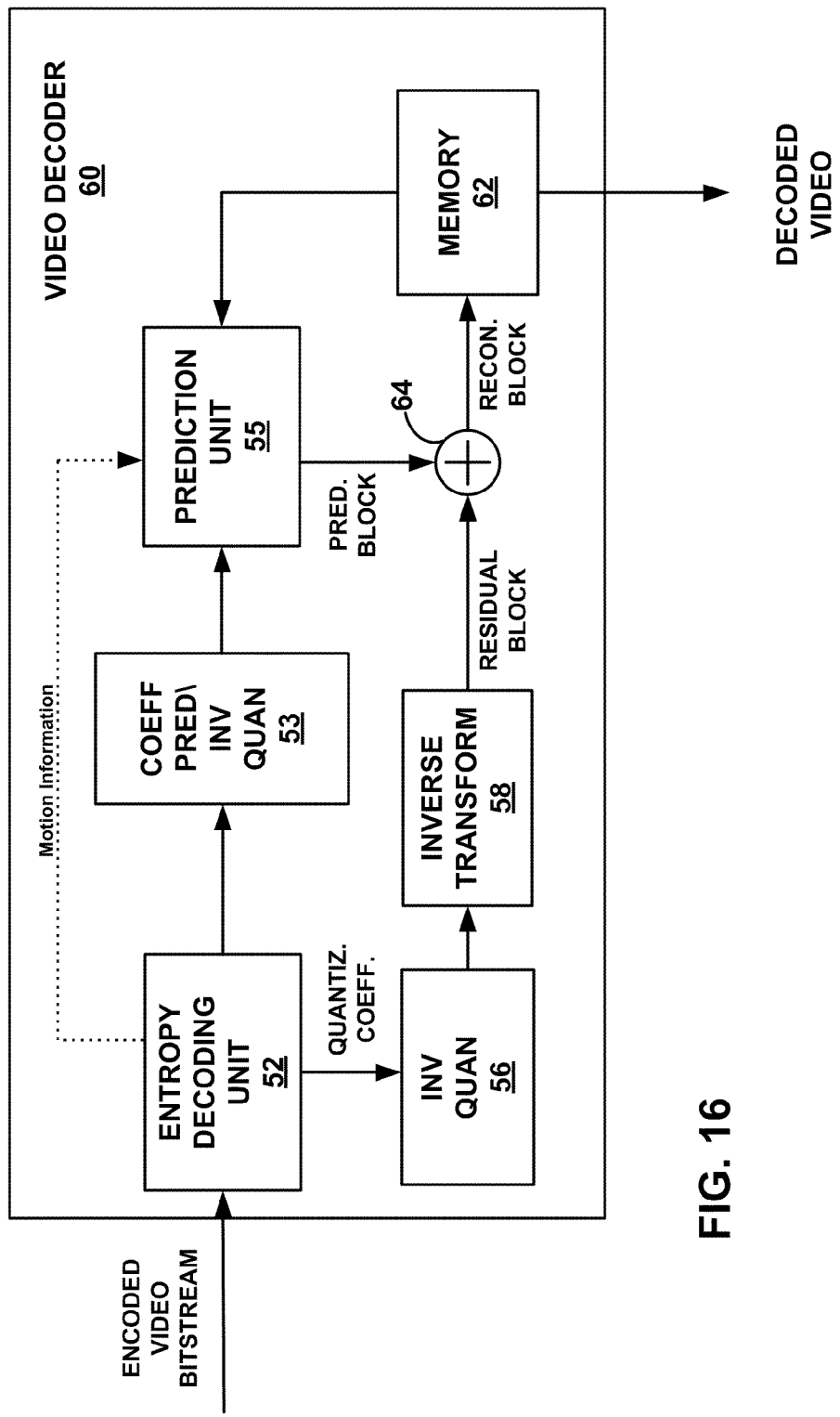
FIG. 16 is a block diagram illustrating an example of a video decoder, which may decode a video sequence that is encoded in the manner described herein.

The set of twelve or more integer pixel positions that surround the sub-pixel positions are shown with shading in FIG. 4, and may include four integer-pixel positions C3, C4, D3 and D4 surrounding the nine half-pel and quarter-pel values, and eight integer-pixel positions B3, B4, C2, C5, D2, D5, E3 and E4 surrounding the four integer-pixel positions. Each of the filter support positions in the two-dimensional array of filter support positions shown in FIG. 4 are within two integer-pixel positions relative to the sub-pixel positions. Such filtering may form part of motion compensation during a video encoding process by video encoder 50 (FIG. 2) or during a video decoding process by video decoder 60 (FIG. 16). During the video encoding process, prediction unit 32 forward a plurality of sets of coefficient values to entropy coding unit 46 as part of the prediction syntax elements. As shown in FIG. 4, the set of twelve or more integer pixel positions that surround the sub-pixel positions has a radial shape and may comprise a set of spatially closest integer pixel positions to the nine half-pel and quarter-pel values defined by the interpolation filter (e.g., filter(s) 39 in FIG. 2).

Entropy coding unit 46 may encode the sets of coefficient values and output the coefficient values of the interpolation filter as part of an encoded bitstream, which may then be transmitted to another device. Each of the plurality of sets of coefficient values defined with respect to each different sub-pixel location shown in FIG. 4 may define different weightings for the twelve or more integer pixel positions. Pixel symmetry may exist such that M sets of coefficient values define N different weightings for the twelve or more integer pixel positions, wherein M and N are positive integers and N is greater than M. In other words, pixel symmetry may allow some of the pixel locations to rely on mirrored, inverted or rotated weightings of other pixel locations so that coefficients do not need to be coded for locations that have pixel symmetry with other sub-pixel locations.

Figure 5:
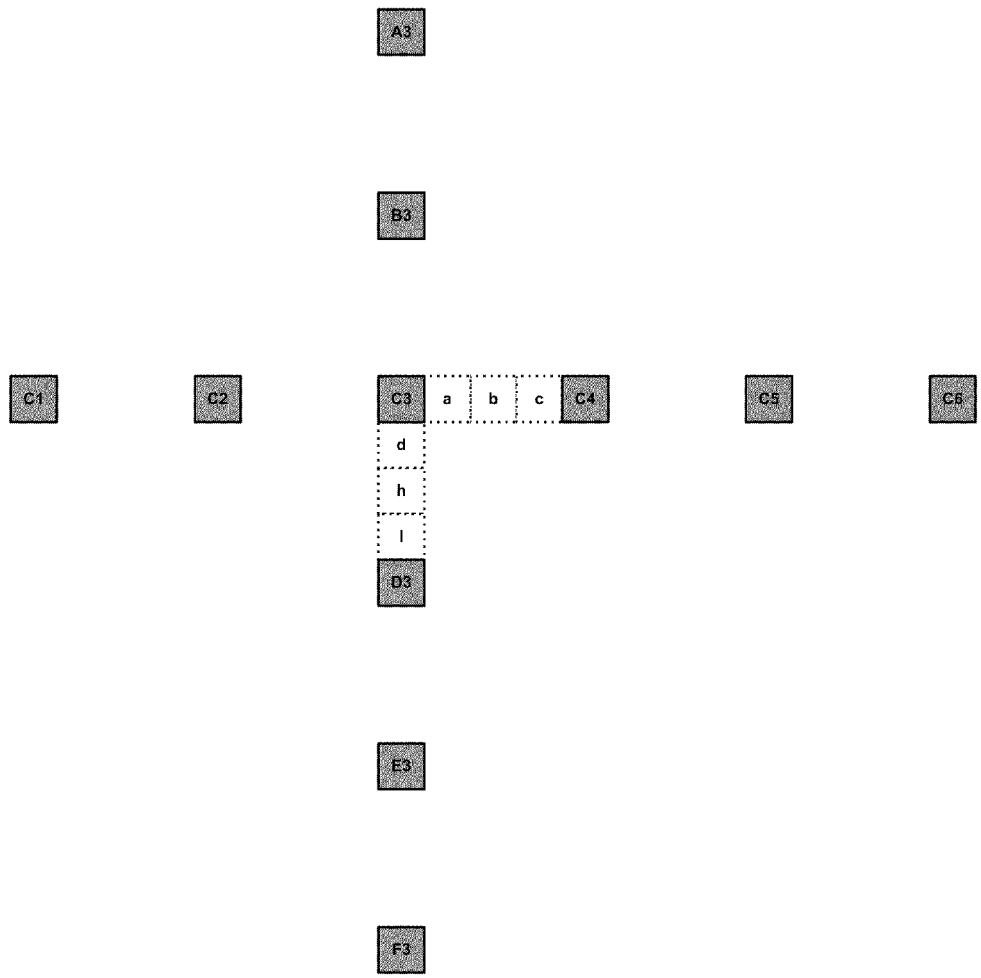
FIG. 5 is a conceptual diagram illustrating a horizontal 6 pixel filter support with respect three horizontal sub-pixel locations, and a vertical 6 pixel filter support with respect three vertical sub-pixel locations.

FIG. 5 is a conceptual diagram illustrating a horizontal six-pixel filter support with respect three horizontal sub-pixel locations, and a vertical six-pixel filter support with respect three vertical sub-pixel locations. The filter support locations are shaded with capitol lettering, and the sub-pixel locations are un-shaded, with lower case lettering and dotted lines. MC unit 37 may compute the sub-pixel values for locations "a," "b," and "c" by applying a linear interpolation filter that defines a one-dimensional array of filter support positions C1-C6. MC unit 37 may also compute the sub-pixel values for locations "d," "h," and "l" by applying a linear interpolation filter that defines a one-dimensional array of filter support positions A3-F3. In this way, linear interpolation filters may be used for six of the fifteen half-pel and quarter-pel values shown in FIG. 3.

Figure 6:
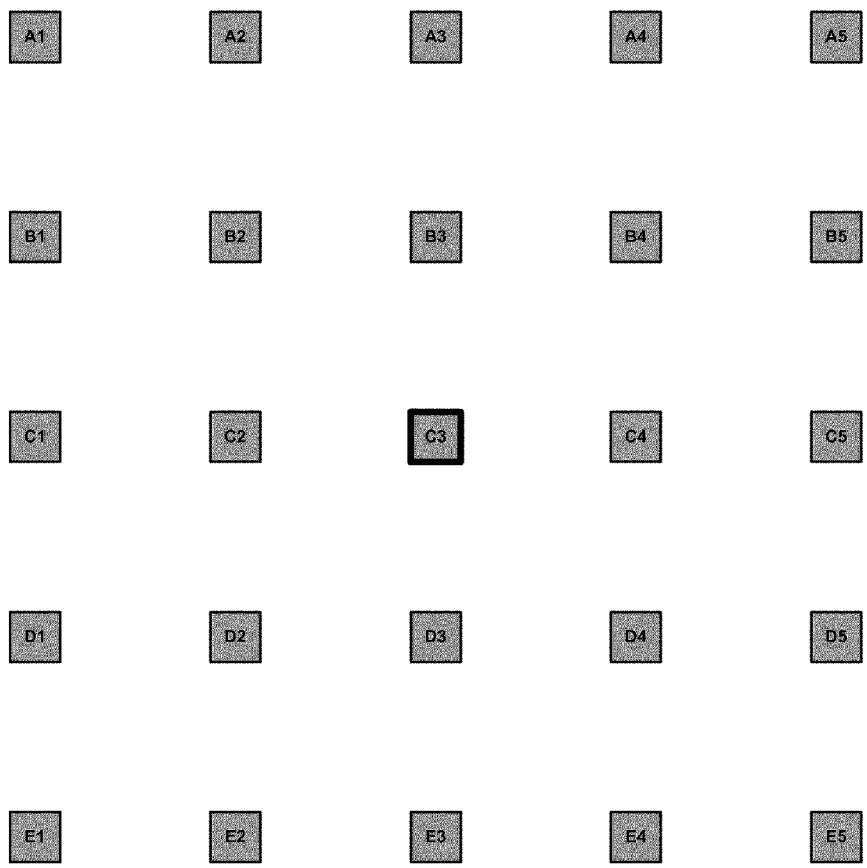
FIG. 6 is a conceptual diagram illustrating a five pixel-by-five pixel filter support for filtering an integer pixel location.

FIG. 6 is a conceptual diagram illustrating a five pixel-by-five pixel filter support for filtering an integer pixel location. In this case interpolation-like filtering may be applied with respect to integer pixel locations in order to generate adjusted integer pixel values. In FIG. 6, for example, integer pixel value at position C3 may be filtered based on a five-by-five pixel array A1-A5, B1-B5, C1-C5, D1-D5 and E1-E5. Other filter supports could be defined for integer filtering. In this case, if ME unit 35 identifies a block of integer pixels, MC unit 37 may filter each pixel based on a five-by-five pixel array shown in FIG. 6 (or other filter support) to generate filtered integer pixel values. In this way, interpolation-like filtering may be applied to integer pixels, which may improve encoding at times of illumination changes or scene fade-ins or fade-outs. In addition, integer filtering may remove noise and facilitate image frame sharpening, and may help improve encoding of fine object movement between successive video frames particularly when symmetry is not imposed on filter coefficients. Integer-pel filtering may also be extremely useful in improving quality and/or compression for video sequences that have focus changes.

Thus, video encoder 22 and/or video decoder 28 may utilize interpolation-like filtering with respect to integer pixel positions in order to generate adjusted integer pixel values. Video encoder 22 or video decoder 28 may, for example, obtain blocks of pixels, wherein the blocks of pixels includes integer pixel values corresponding to integer pixel positions within the block of pixels. Video encoder 22 or video decoder 28 may filter the integer pixel values based on other integer pixel values within the blocks of pixels to generate adjusted integer pixel values, wherein the adjusted integer pixel values correspond to the integer pixel positions, and generating a prediction block based on the adjusted integer pixel values. The prediction block can then be used to encode or decode a video block, depending upon whether the process is performed during encoding or decoding.

If the technique is performed during an encoding process, video encoder 22 may generate a residual video block as a difference between a current video block being encoded and the prediction block. Video encoder 22 may also encode one set of filter coefficients per coded unit for integer filtering, or possibly encode two or more sets of filter coefficients per coded unit for integer filtering at different locations within the coded unit. In the example of FIG. 6, the filter supports for the integer filtering may define a two-dimensional filter, e.g., a 5-by-5 filter with offset. Furthermore, coefficient symmetry may exist between at least some coefficients used for the filtering such that only a subset of the 25 different coefficients are needed to determine all 25 coefficients for the filter. Many other filter sizes and shapes may be used in accordance with integer-pel filtering.

If the integer-pel filtering is performed during a decoding process, the technique may comprise generating a reconstructed video block as a sum of a residual video block associated with a current video block being decoded and the prediction block. In this case, the decoding device (e.g., destination device 16) may receive one set of filter coefficients per coded unit for integer filtering, or may receive two or more sets of filter coefficients per coded unit for integer filtering at different locations within the coded unit. Each coded unit may have one or more sets of integer-pel filtering coefficients, as well as sets of sub-pel filtering coefficients, e.g., eight sets that may be used to generate all fifteen sets for half-pel and quarter-pel positions.

Again, interpolation-like filtering of integer pixel values may improve compression specifically during illumination changes, scene fade-ins or fade-outs, may remove noise and facilitate image frame sharpening, and may help improve encoding of fine object movement between successive video frames particularly when symmetry is not imposed on filter coefficients. Furthermore, integer-pel filtering is also found to be extremely useful, e.g., to improve compression, in video sequences that have focus changes.

Conventionally, interpolation-like filtering is not performed for integer-pixel positions in AIF. Instead, the corresponding integer-pixel position in the reference frame is simply used "as is." However, in accordance with this disclosure, a filter may be used for integer-pixel locations in a manner that is similar to interpolations. Interpolation filtering on integer-pixel positions is technically a misnomer, as the pixel values of integer-pixel positions already exist. Thus, the filtering of integer-pixel positions is refereed to herein as interpolation-like filtering, and may be viewed as simply filtering the integer-pixel values to generate new adjusted pixel values.

Unlike interpolation filtering for sub-pixel positions, where the goal is to obtain the non-existent values in the reference frame, pixels at integer positions in the reference frame already exists. Yet, applying filtering on the integer-pixel positions in the reference frame offers a number of benefits. For example, when integer-pixel positions contain an offset, filtering of the integer-pixel positions may allow better capture of illumination changes between frames. Additionally, filtering on the integer-pixel positions may allow the integer-pixel positions to capture special effects such as fade-in and fade-out. Filtering on the integer-pixel positions may also remove certain signal noises (such as camera noise) and/or performs sharpening, if needed. Furthermore, if no symmetry on the integer-pixel filter is imposed, the integer-pixel filter may help capture fine object movement, such as object movement that is not a multiple of quarter-pixel. Finally, integer pixel filtering may also be useful in improving compression of video sequences when focus changes occur.

In some instances, interpolation filtering of integer-pixel positions may be dependent upon motion vectors. In other words, MC unit 37 of prediction unit 32 may adaptively apply the interpolation filtering based on the motion vector identified by ME unit 35. For instance, interpolation filtering of integer-pixel positions may be performed when the motion vector points to an integer-pixel position. The interpolation filtering may result in an adjusted pixel value for the integer-pixel position. When the motion vector points to a sub-pixel position, no filtering of integer-pixel positions is performed with respect to the integer pixel values, but filtering may be used for interpolation of the sub-pixel values. In this manner, integer-pixel filtering may be considered adaptive based on motion vectors.

For integer-pixel positions, a 5-by-5 interpolation filter in the form of equation (15) may be derived using the same analytical process used to derive the sub-pixel position filters.

$$p^{FP} = \sum_{i=0}^{4}\sum_{j=0}^{4} P_{i,j} h_{i,j}^{FP} + o^{FP}, \quad (15)$$

where $p^{FP}$ is the filtered integer pixel value, $P_{i,j}$ is the integer pixel value at position (i, j), $h^{FP}_{i,j}$ is the coefficient for position (i, j), and $o^{FP}$ is a filter offset. In some instances, the interpolation filter for integer-pixel positions may not have a filter offset (i.e., $o^{FP}=0$). In other instances, the filter offset $o^{FP}$ may use any of a number of techniques.

Different offsets may be defined for each sub-pixel position, e.g., fifteen different offsets may be defined for each sub-pixel position shown in FIG. 3. Another offset may be defined for integer-pixels, bringing the total number of offsets to sixteen. Co-pending and commonly assigned U.S. patent application Ser. No. 12/420,280, filed for Karczewicz et al., and entitled "OFFSETS AT SUB-PIXEL RESOLUTION", which was filed on the same day as the present application, and which is incorporated herein by reference, provides many additional details on the use of many offsets for different pixel and sub-pixel locations.

In order to reduce the number of filter coefficients to be transmitted, coefficient symmetry as in equation (16) may be imposed on the integer-pixel filter.

$$h_{i,j}^{FP} = h_{i,4-j}^{FP} = h_{4-i,j}^{FP} = h_{4-i,4-j}^{FP}, \text{ for } i,j=0\ldots 4 \quad (16)$$

Other forms of coefficient symmetry may also be used. Whether coefficient symmetry is imposed may be decided by the encoder and signaled to the decoder. If the symmetry as in (16) is used on the integer-pixel filter, then 9 filter coefficients and 1 offset may need to be sent to the decoder.

Coding of the offsets may be done by first coding an integer offset and then coding each fractional offset. In this case, the integer offset and the fractional offsets are coded differently. The integer offset may be coded using signed exponential-Golomb code. Depending on the magnitude of the integer offset, the fractional offsets may be quantized differently than the integer offset. For example, coarser levels of quantization may be applied on the fractional offsets when an integer offset has a large magnitude. After quantization, the fractional offsets may be coded using fixed length codes. As an example, the following pseudo-code may illustrate how a given fractional offset may be coded using different fixed length codes defined based on the integer offset value.

---

Let offsetI be the integer offset
Let offsetF be the fractional offset
Let offsetFbits be the number of bits used to quantize offsetF
Let abs(a) be the absolute value of a
    if(abs(offsetI) = 0)
        offsetFbits = 5
    else if(abs(offsetI) < 3)
        offsetFbits = 4
    else if(abs(offsetI) < 7)
        offsetFbits = 2
    else
        offsetFbits = 0

---

In this case, video encoder 50 may use coefficient prediction and quantization unit 41 that for each of the offset values assigns a first number of bits to an integer portion of a given offset value and assigns a second number of bits to a fractional portion of the given offset value, wherein the first and second numbers of bits are determined based on a magnitude of the integer portion. In this case, the quantized versions of the offset values may be forwarded from prediction unit 32 as prediction syntax elements after quantization of the offset values is performed consistent with the pseudo-code above. In any case, video encoder 50 may encode the first number of bits differently than the second number of bits.

Figure 7:
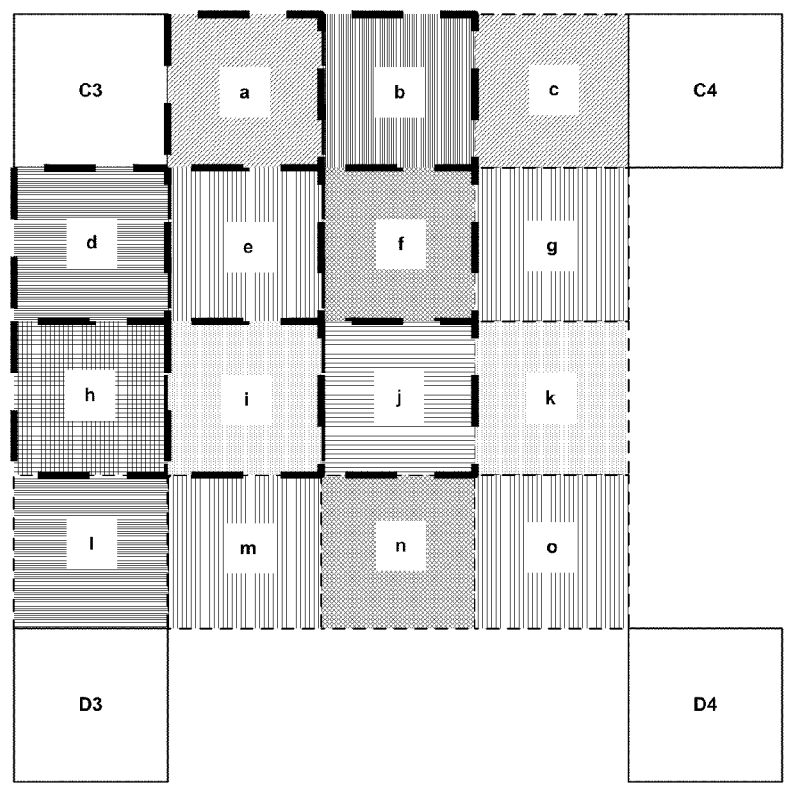
FIG. 7 is a conceptual diagram illustrating four integer pixel positions and fifteen sub-pixel positions with shading to group pixel positions that may use pixel symmetry for filter coefficients consistent with this disclosure.

FIG. 7 is a conceptual diagram illustrating four integer pixel positions and fifteen sub-pixel positions with shading to group pixel positions that may use pixel symmetry for filter coefficients consistent with this disclosure. In particular, FIG. 7 illustrates sub-pixel positions "a" through "o" corresponding to integer pixel position C3. The sub-integer pixel positions shown in FIG. 7 correspond to those of FIGS. 4 and 5. That is, sub-pixel locations "e," "f," "g," "i," "j," "k," "m," "n," and "o" may have values determined by a twelve pixel support as shown in FIG. 4, whereas sub-pixel locations "a," "b," and "c," and sub-pixel locations "d," "h," and "l," may have values determined by horizontal and linear pixel supports shown in FIG. 5.

In this scenario, pixel symmetry may be imposed such that the filter coefficients for pixel location "a" are symmetry with respect to the filter coefficients for pixel location "c." Similarly, pixel symmetry may be imposed such that the filter coefficients for pixel location "d" are symmetric with respect to the filter coefficients for pixel location "l." Pixel symmetry may be imposed such that the filter coefficients for pixel location "e" are symmetric with respect to the filter coefficients for pixel locations "g," "m" and "o," and pixel symmetry may be imposed such that the filter coefficients for pixel location "i" are symmetric with respect to the filter coefficients for pixel locations "k," and pixel symmetry may be imposed such that the filter coefficients for pixel location "f" are symmetric with respect to the filter coefficients for pixel locations "n." Therefore, only eight sets of coefficient values may need to be communicated as part of a video bitstream in order to enable a decoder to generate complete sets of coefficient values for all fifteen pixel locations. Furthermore, for any given set of coefficients, coefficient symmetry may allow only a subset of the coefficient values to be sent, and the decoder can generate the complete set of coefficient values for a given pixel location based on the subset and coefficient symmetry.

One aspect of this disclose is to actually remove any pixel symmetry between sub-pixel positions "a" and "c" relative to sub-pixel positions "d" and "l." In addition, pixel symmetry may be avoided for sub-pixel position "f" relative to sub-pixel position "i." In addition, pixel symmetry may be avoided for sub-pixel position "k" relative to sub-pixel position "n." In such cases, diagonal correlation may be low, making it inefficient or ineffective to impose diagonal symmetry. In this manner, the eight sets of coefficients used to generate all fifteen sets of coefficients may be a larger set than some conventional techniques insofar as symmetry is avoided in the diagonal dimension for some of the pixel locations. In some cases, diagonal pixel symmetry and diagonal coefficient symmetry may be eliminated or avoided to allow for variance in the vertical dimensions.

Referring again to FIG. 1, video encoder 22 may determine eight sets of filter coefficients and use the eight sets of filter coefficients to generate all fifteen sets of filter coefficients corresponding to fifteen different sub-pixel locations based on coefficient symmetry and pixel symmetry, and output the eight sets of filter coefficients as part of an encoded bitstream. Eight sets of filter coefficients may be output for every coded unit of the encoded bitstream, or possibly several occurrences of the eight sets of filter coefficients may be output for different areas of a coded unit.

The fifteen sets correspond to every half-pel and quarter-pel sub-pixel location shown in FIG. 3, and the eight sets, the coefficient symmetry and the pixel symmetry define filter supports for every half-pel and quarter-pel sub-pixel location. Video decoder 28 of destination device 16 may receive eight sets of filter coefficients as part of an encoded video bitstream, generate fifteen sets of filter coefficients corresponding to fifteen different sub-pixel locations based on the eight sets of filter coefficients, generate interpolated predictive data for video decoding based on one of the fifteen sets of filter coefficients, wherein the interpolated predictive data corresponds to one of the fifteen different sub-pixel locations, and decode one or more video blocks base on the interpolated predictive data.

At least some of the eight sets of filter coefficients may have coefficient symmetry such that a given set with coefficient symmetry comprises a subset of the filter coefficients associated with a filter support for a given sub-pixel location associated with the given set. Thus, video decoder 28 may generate the fifteen sets of filter coefficients based at least in part on pixel symmetry between two or more different sub-pixel locations. Moreover, video decoder 28 may generate the fifteen sets of filter coefficients based at least in part on pixel symmetry between two or more different sub-pixel locations, and based at least in part on coefficient symmetry defined for a given set such that the given set with coefficient symmetry comprises a subset of the filter coefficients associated with a filter support for a given sub-pixel location associated with the given set.

Again, the fifteen sets may correspond to every half-pel and quarter-pel sub-pixel location. Pixel symmetry may exist between different ones of the fifteen sets of filter coefficients in a vertical dimension and in a horizontal dimension, but pixel symmetry does not exist in a diagonal dimension for at least some of the fifteen sets of filter coefficients. As explained in greater detail below, two of the eight sets may define three of the fifteen sets for a horizontal filter support, two of the eight sets may define three of the fifteen sets for a vertical filter support, and four of the eight sets may define nine of the fifteen sets for a two-dimensional filter support. The two-dimensional support may comprise a useful 12 position filter support surrounding nine sub-pixel positions in a radial shape.

Specifically, the interpolated predictive data may comprise fifteen half-pel and quarter-pel values, e.g., shown in FIG. 7, wherein the interpolation filter defines a two-dimensional array of twelve filter support positions, e.g., shown in FIG. 4, that are applied to define nine of the fifteen half-pel and quarter-pel values and, e.g., also shown in FIG. 4. Generating the interpolated predictive data may further comprise applying linear interpolation filters that define one-dimensional arrays of filter support positions for six of the fifteen half-pel and quarter-pel values, e.g., as shown in FIG. 5.

Horizontal symmetry and lack of diagonal symmetry can be seen with respect to sub-pixel positions "a" and "c" or with respect to sub-pixel positions "i" and "k." In this case, sub-integer pixel positions "a" and "c" are symmetric along a horizontal X axis, but symmetry does not exist along a diagonal axis for these pixels such that sub-pixel locations "d" and "l" are not symmetric with respect to sub-pixel positions "a" and "c" respectively. Similarly, sub-pixel positions "i" and "k" are symmetric along a horizontal X axis, but symmetry does not exist along diagonal axis for these pixels such that sub-pixel locations "f" and "n" are not symmetric with respect to sub-pixel positions "i" and "k" respectively.

The pixel symmetry means that a first set of coefficients with respect to the first sub-pixel position are symmetric relative to a second set of coefficients with respect to the second sub-pixel position. For example, pixel location "a" has pixel symmetry with respect to pixel location "c," and pixel location "d" has pixel symmetry with respect to pixel location "l." Pixel location "f" has pixel symmetry with respect to pixel location "n," and pixel location "i" has pixel symmetry with respect to pixel location "k." Pixel location "e" has pixel symmetry with respect to pixel locations "g," "m," and "o." The shading shown in FIG. 7 demonstrates this pixel symmetry, e.g., with common shading corresponding to pixel locations that are symmetric with respect to other pixel locations. In this case, coefficients for eight pixel locations (together with aspects of pixel symmetry) may define coefficients for all fifteen pixel locations. In addition, within a given set of coefficients, coefficient symmetry may exist such that only a subset of the coefficients in that set of coefficients needs to be communicated with the bitstream.

Video encoder 22 can generate encoded video data based on interpolated predictive data, wherein the interpolated predictive data comprises fifteen half-pel and quarter-pel values, wherein the interpolation filter defines a two-dimensional array of twelve filter support positions that are applied to define nine of the fifteen half-pel and quarter-pel values. Generating the encoded video data based on interpolated predictive data may further comprise applying linear interpolation filters that define one-dimensional arrays of filter support positions for six of the fifteen half-pel and quarter-pel values.

FIG. 8 is a conceptual diagram illustrating six horizontal linear pixel support positions C1-C6 relative to a sub-pixel position "b," with shading that shows coefficient symmetry. In this case, coefficient symmetry means that only three filter coefficients are needed for C1, C2 and C3 in order to define the entire set of coefficients for filter support positions C1-C6. C1 is symmetric with C6, C2 is symmetry with C5 and C3 is symmetric with C4. Thus, only three coefficients need to be communicated as part of an encoded video bitstream in order to define the set of six coefficients needed to interpolate sub-pixel position "b."

FIG. 9 is a conceptual diagram illustrating six horizontal linear pixel support positions relative to a sub-pixel, with shading that shows a lack of any coefficient symmetry. Thus, all six coefficients are needed in order to define the set of coefficients for filter support with respect to sub-pixel position "a." As noted above, however, pixel symmetry means that these same coefficients with respect to sub-pixel position "a" can also be used to derive the filter support for sub-pixel position "c" (see FIG. 7). Thus, only six coefficients need to be communicated as part of an encoded video bitstream in order to define two different sets of six coefficients needed to interpolate sub-pixel position "a" and "c."

FIG. 10 is a conceptual diagram illustrating six vertical linear pixel support positions A3, B3, C3, D3, E3 and F3 relative to a sub-pixel "h," with shading that shows coefficient symmetry. In this case, coefficient symmetry means that only three filter coefficients are needed for A3, B3 and C3 in order to define the entire set of coefficients for filter support positions A3, B3, C3, D3, E3 and F3. A3 is symmetric with F3, B3 is symmetry with E3 and C3 is symmetric with D3. Thus, only three coefficients need to be communicated as part of an encoded video bitstream in order to define the set of six coefficients needed to interpolate sub-pixel position "h."

FIG. 11 is a conceptual diagram illustrating six vertical linear pixel support positions relative to a sub-pixel, with shading that shows a lack of any coefficient symmetry. Thus, all six coefficients are needed in order to define the set of coefficients for filter support with respect to sub-pixel position "d." As noted above, however, pixel symmetry means that these same coefficients with respect to sub-pixel position "d" can also be used to derive the filter support for sub-pixel position "l" (see FIG. 7). Thus, only six coefficients need to be communicated as part of an encoded video bitstream in order to define two different sets of six coefficients needed to interpolate sub-pixel position "d" and "l".

Figure 12:
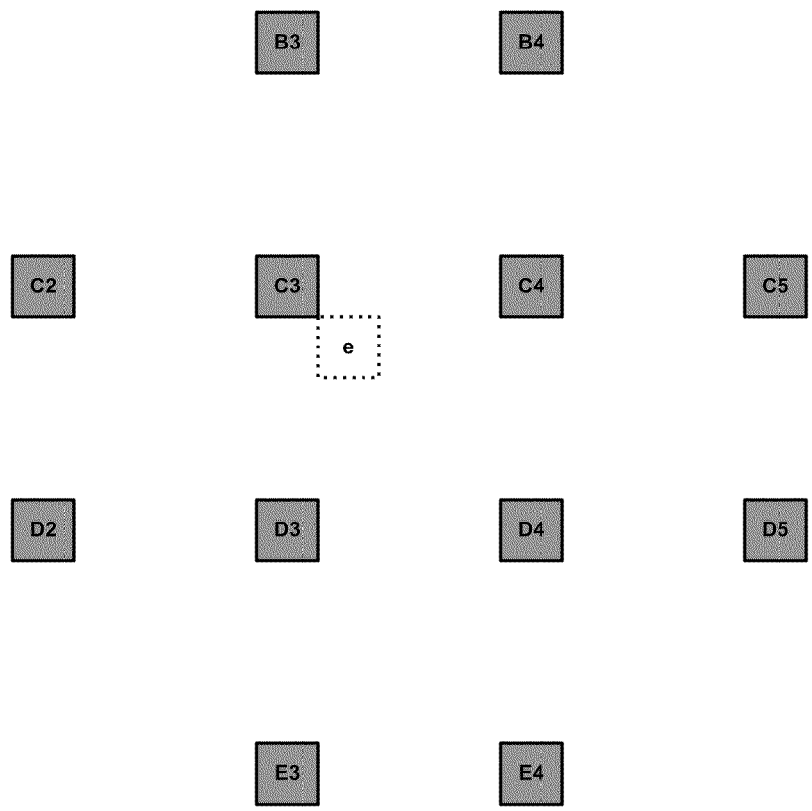
FIG. 12 is a conceptual diagram illustrating twelve two-dimensional pixel support positions relative to a sub-pixel, with shading that shows a lack of any coefficient symmetry.

FIG. 12 is a conceptual diagram illustrating twelve two-dimensional pixel support positions (the integer pixel positions shown with capitol lettering and shading) relative to a sub-pixel position "e." The shading that shows a lack of any coefficient symmetry. Thus, all twelve coefficients are needed in order to define the set of coefficients for filter support with respect to sub-pixel position "e." As noted above, however, pixel symmetry means that these same coefficients with respect to sub-pixel position "e" can also be used to derive the filter support for sub-pixel positions "g," "m," and "o" (see FIG. 7). Therefore, 12 coefficients define the filter support sub-pixel position "e" and these same coefficients can be used to derive the set of coefficients for sub-pixel positions "g," "m," and "o."

Figure 13:
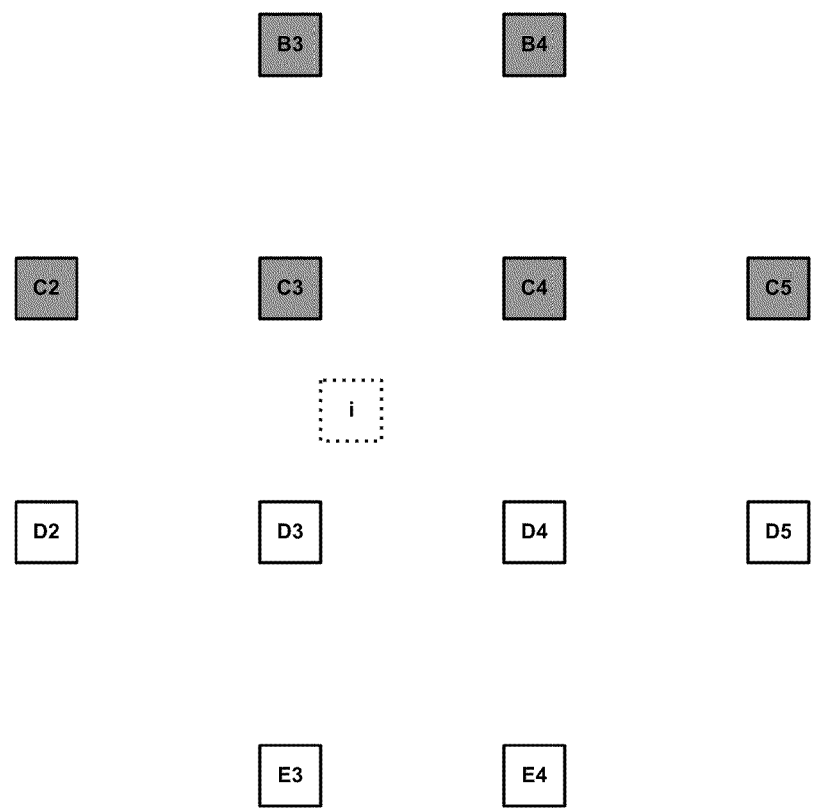
FIG. 13 is a conceptual diagram illustrating twelve two-dimensional pixel support positions relative to a sub-pixel, with shading that shows coefficient symmetry.

FIG. 13 is a conceptual diagram illustrating twelve two-dimensional pixel support positions (the integer pixel positions shown with capitol lettering) relative to a sub-pixel "i," with shading that shows coefficient symmetry. In this case, coefficient symmetry means that the filter coefficients for filter support positions B3, B4, C2, C3, C4 and C5 can be used to define the filter coefficients for filter support positions E3, E4, D2, D3, D4 and D5. B3 is symmetric with E3, B4 is symmetry with E4, C2 is symmetric with D2, C3 is symmetry with D3, C4 is symmetric with D4, and C5 is symmetric with D5. Thus, only six coefficients need to be communicated as part of an encoded video bitstream in order to define the set of twelve coefficients needed to interpolate sub-pixel position "i." Furthermore, as noted above, sub-pixel position "i" may have pixel symmetry with respect to sub-pixel position "k." Therefore, the same subset of six coefficients can define the entire sets of twelve filter coefficients for sub-pixel positions "i" and "k."

Figure 14:
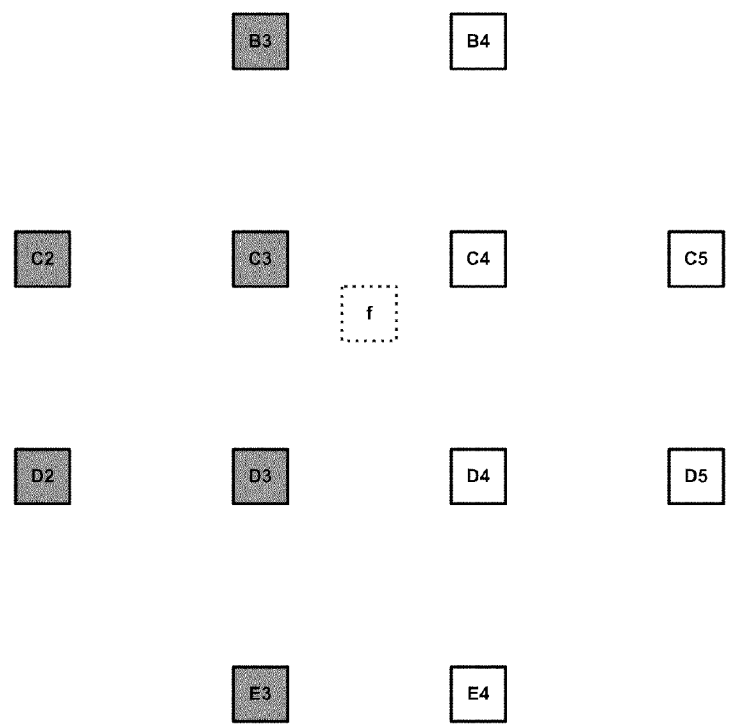
FIG. 14 is a conceptual diagram illustrating twelve two-dimensional pixel support positions relative to a sub-pixel, with shading that shows coefficient symmetry.

FIG. 14 is a conceptual diagram illustrating twelve two-dimensional pixel support positions (the integer pixel positions shown with capitol lettering) relative to a sub-pixel "f," with shading that shows coefficient symmetry. In this case, coefficient symmetry means that the filter coefficients for filter support positions C2, D2, B3, C3, D3 and E3 can be used to define the filter coefficients for filter support positions C5, D5, B4, C4, D4 and E4. C2 is symmetric with C5, D2 is symmetry with D5, B3 is symmetric with B4, C3 is symmetry with C4, D3 is symmetric with D4, and E3 is symmetry with E4. Thus, only six coefficients need to be communicated as part of an encoded video bitstream in order to define the set of twelve coefficients needed to interpolate sub-pixel position "f." Furthermore, as noted above, sub-pixel position "f" may have pixel symmetry with respect to sub-pixel position "n." Therefore, the same subset of six coefficients can define the entire sets of twelve filter coefficients for sub-pixel positions "f" and "n."

Figure 15:
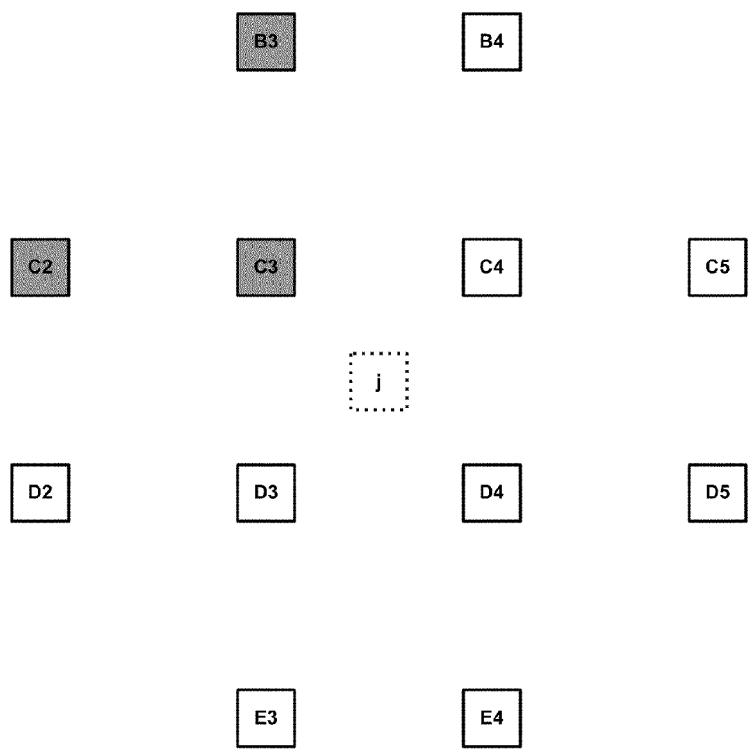
FIG. 15 is a conceptual diagram illustrating twelve two-dimensional pixel support positions relative to a sub-pixel, with shading that shows coefficient symmetry.

FIG. 15 is a conceptual diagram illustrating twelve two-dimensional pixel support positions (the integer pixel positions shown with capitol lettering) relative to a sub-pixel "j," with shading that shows coefficient symmetry. In this case, coefficient symmetry means that only three filter coefficients are needed for B3, C2 and C3 in order to define the entire set of twelve coefficients for filter support positions B3, B4, C2, C3, C4, C5, D2, D3, D4, D5, E3 and E4. C3 is symmetric with C4, D3 and D4, C2 is symmetry with D2, C5 and E4, and B3 is symmetric with B4, E3 and D5. Thus, only three coefficients need to be communicated as part of an encoded video bitstream in order to define the set of twelve coefficients needed to interpolate sub-pixel position "j."

FIG. 16 is a block diagram illustrating an example of a video decoder, which may decode a video sequence that is encoded in the manner described herein. Video decoder 60 is one example of a specialized video computer device or apparatus referred to herein as a "coder." Video decoder 60 includes an entropy decoding unit 52 that entropy decodes the received bitstream to generate quantized coefficients and the prediction syntax elements. The prediction syntax elements may include a coding mode, one or more motion vectors, information identifying an interpolation technique use to generate the sub-pixel data, coefficients for use in interpolation filtering, and/or other information associated with the generation of the prediction block.

The prediction syntax elements, e.g., the coefficients, are forwarded to prediction unit 55. If prediction is used to code the coefficients relative to coefficients of a fixed filter, or relative to one another, coefficient prediction and inverse quantization unit 53 can decode the syntax elements to define the actual coefficients. Also, if quantization is applied to any of the prediction syntax, coefficient prediction and inverse quantization unit 53 can also remove such quantization. Filer coefficients, for example, may be predictively coded and quantized according to this disclosure, and in this case, coefficient prediction and inverse quantization unit 53 can be used by video decoder 60 to predictively decode and de-quantize such coefficients.

Prediction unit 55 may generate prediction data based on the prediction syntax elements and one or more previously decoded blocks that are stored in memory 62, in much the same way as described in detail above with respect to prediction unit 32 of video encoder 50. In particular, prediction unit 55 may perform one or more of the interpolation filtering techniques of this disclosure during motion compensation to generate a prediction block with a particular precision, such as quarter-pixel precision. As such, one or more of the techniques of this disclosure may be used by video decoder 60 in generating a prediction block. Prediction unit 55 may include a motion compensation unit that comprises filters used for interpolation and interpolation-like filtering techniques of this disclosure. The motion compensation component is not shown in FIG. 16 for simplicity and ease of illustration.

Inverse quantization unit 56 inverse quantizes, i.e., de-quantizes, the quantized coefficients. The inverse quantization process may be a process defined for H.264 decoding. Inverse transform unit 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction unit 55 to form a reconstructed version of the original block encoded by video encoder 50. If desired, a deblocking filter may also be applied to filter the decoded blocks in order to remove blockiness artifacts. The decoded video blocks are then stored in reference frame store 62, which provides reference blocks for subsequent motion compensation and also produces decoded video to drive display device (such as device 28 of FIG. 1).

NS-AIF techniques may compute pixel values for the 2D sub-pixel positions using an interpolation filter having 36-position filter support (i.e., a 2D 6×6 filter support). S-AIF uses separable integer pixel positions as filter support for interpolation filtering first in a horizontal direction than in a vertical dimension. D-AIF uses a less complex interpolation filter for computing the 2D sub-pixel positions than NS-AIF. In D-AIF the 2D sub-pixel positions are computed using an interpolation filter having either a 6-position filter support or a 12-position diagonal filter support.

One drawback of using the diagonal filter support as in D-AIF is that the integer-pixel positions used in filtering are far away from the current position to be interpolated. As distance between the current position to be interpolated and the positions of the pixels used as filter support increases, spatial pixel correlation decreases. As such, the diagonal filter support used in D-AIF is less suitable for forming an accurate prediction.

In order to provide better prediction using pixels with higher correlation with the position to be interpolated (that is, pixel positions that are closer by or a shorter distance from the position to be interpolated), while maintaining the same low complexity offered by D-AIF, the 12-position filter support shown in FIG. 4 may be used for interpolation. The integer-pixel positions used in the 12-position filter support described in this disclosure include the four integer-pixel positions surrounding the sub-pixel positions, i.e., integer-pixel positions C3, C4, D3 and D4, which may be referred to as "corner" integer-pixel positions as they are located near the corners of the 2D sub-pixel positions. In addition to the corner integer-pixel positions, one or more integer-pixel positions immediately adjacent to the corner integer-pixel positions may also be used in the filter support. The integer-pixel positions immediately adjacent to the corner integer-pixel positions may include integer-pixel positions directly above (toward the top or north) or directly below (toward the bottom or south) the corner integer-pixel positions as well as integer-pixel positions directly to the left (or west) or directly to the right (or east) of the corner integer-pixel positions. In the example illustrated in FIG. 4, the 12-position filter support may include integer-pixel locations B3, B4, C2, C3, C4, C5, D2, D3, D4, D5, E3 and E4. All of these integer-pixel positions are located within two integer-pixel positions of the sub-pixel to be interpolated.

Filter support in accordance with the techniques of this disclosure may, however, include additional integer-pixel locations. For example, the filter support may include integer-pixel locations that are located within three integer-pixel positions of the sub-pixel position to be interpolated that form a radial shape.

Even quarter-pixel positions or finer resolution may be interpolated based on integer pixel positions located within at least two integer-pixel positions. In this manner, the filter support techniques of this disclosure provide better interpolation prediction using integer-pixels with higher correlation with the position to be interpolated, while maintaining the same low complexity offered by D-AIF.

As described above, sub-pixel symmetry may enforce the same set of filter coefficients (and the mirrored, inverted and/or rotated versions of the set) for a group of one or more sub-pixel positions. Using an analytical process, such as that in equation (5) may be used to derive interpolation filter coefficients for all sub-pixel positions, e.g., fifteen sub-pixel positions in the case of quarter-pixel precision. Analysis of correlation among the fifteen sets of interpolation filter coefficients reveals a relatively strong correlation between filter coefficients of sub-pixel positions (both 1D and 2D sub-pixel positions) in the same dimension (e.g., vertical or horizontal dimension). To the contrary, correlation between filter coefficients of the sub-pixel positions in different diagonal directions may be noticeably weaker.

For example, there may be a high correlation between filter coefficients for sub-pixel positions "a" and "c," which are both in the horizontal dimension. As another example, there may be a high correlation between filter coefficients for sub-pixel positions "d" and "l," which are both in the vertical dimension. However, there may be little, if any, correlation between filter coefficients for sub-pixel positions "a," which is in the horizontal dimension, and sub-pixel position "d," which is in the vertical dimension. Based on these observations of the correlations, sub-pixel symmetry may be designed such that sub-pixel symmetry for filter coefficients of sub-pixel positions in diagonal dimensions is not imposed. This leads to eight sets of coefficients, as described herein, which may be more sets than needed for some conventional processes. By eliminating diagonal pixel symmetry for some pixel locations, as described herein, video encoding and compression may be improved.

Again, FIG. 7 shows pixel positions with the same shadings (or hatchings) that belong to a group of sub-pixel positions that have sub-pixel symmetry. In particular, sub-pixel positions "a" and "c" form a first group having sub-pixel symmetry, sub-pixel positions "d" and "l" form a second group having sub-pixel symmetry, sub-pixel positions "e," "g," "m," and "o" form a third group having sub-pixel symmetry, sub-pixel positions "f" and "n" form a fourth group having sub-pixel symmetry, and sub-pixel positions "i" and "k" form a fifth group having sub-pixel symmetry. Sub-pixel positions "b," "h," and "j" do not have sub-pixel symmetry with any other sub-pixel positions. As such, sub-pixel positions "b," "h," and "j" may be viewed as belonging to their own groups; a sixth, seventh and eighth group, respectively. Each group of coefficients (which may be subsets due to coefficient symmetry) may be communicated once per coded unit, or possibly multiple times per coded unit if different types of filtering is defined for different areas or features of a coded unit. Coefficients for integer-pel interpolation-like filtering may also be sent once or several times per coded unit.

In NS-AIF and D-AIF sub-pixel symmetry exists between sub-pixel positions in the same dimension, e.g., two sub-pixel positions in the vertical dimension or two sub-pixel positions in the horizontal dimension. In some conventional NS-AIF and D-AIF, symmetry also exists diagonally between sub-pixel positions in different dimensions. For example, sub-pixel symmetry exists between sub-pixel position "a" in the vertical dimension and sub-pixel position "d" in the horizontal direction in some conventional NS-AIF and D-AIF. With sub-pixel symmetry in horizontal, vertical and diagonal dimensions, as few as five unique sets of interpolation filter coefficients may be used for quarter-pixel precision.

For some types of S-AIF, on the other hand, sub-pixel symmetry exists between sub-pixel positions in the vertical direction (or dimension), but not sub-pixel positions in the horizontal dimension. In other words, sub-pixel symmetry does not always exist for sub-pixel positions in the same dimension. Sub-pixel symmetry also does not exist in diagonal dimensions. The symmetry of some S-AIF schemes, thus, require more sets of interpolation coefficients. In particular, for quarter-pixel precision, some S-AIF schemes require eleven unique sets of interpolation coefficients.

The sub-pixel symmetry scheme described in this disclosure, and illustrated in FIG. 7, may result in more accurate prediction than the sub-pixel symmetry described above for some types of NS-AIF and D-AIF. In particular, the sub-pixel symmetry scheme of FIG. 7 imposes sub-pixel symmetry in one dimension (e.g., in the horizontal direction or the vertical direction), but does not impose sub-pixel symmetry simultaneously in both dimensions (e.g., diagonally).

By not imposing sub-pixel symmetry for sub-pixel positions diagonally, the weak correlation between the interpolation filter coefficients and the sub-pixel positions in different dimensions is not integrated into the interpolation. Although more sets of interpolation coefficients may be required (e.g., eight instead of five), the resulting interpolated prediction data may be more accurate. Diagonal coefficient symmetry may also be avoided or eliminated, in much the same way.

Prediction unit 32 may also impose coefficient symmetry as described above. In particular, coefficient symmetry is imposed for filter coefficients in one dimension (e.g., the horizontal or vertical direction), but not for both dimensions in a diagonal manner. For example, the filter coefficients for sub-pixel position "e" are not forced to be diagonally symmetric as in the NS-AIF scheme described above and represented in equation (11). The coefficient symmetry is summarized below in equations (17)-(21).

$$h_0^b = h_5^b, h_1^b = h_4^b, h_2^b = h_3^b \quad (17)$$

$$h_0^h = h_5^h, h_1^h = h_4^h, h_2^h = h_3^h \quad (18)$$

$$h_{i,j}^f = h_{i,3-j}^f, \text{ for } i,j=0\ldots3 \quad (19)$$

$$h_{i,j}^i = h_{3-i,j}^i, \text{ for } i,j=0\ldots3 \quad (20)$$

$$h_{i,j}^j = h_{i,3-j}^j = h_{3-i,j}^j = h_{3-i,3-j}^j, \text{ for } i,j=0\ldots3 \quad (21)$$

Note that for sub-pixel positions "f," "i," and "j," some filter coefficients, i.e., $h_{0,0}^{SP} = h_{0,3}^{SP} = h_{3,0}^{SP} = h_{3,3}^{SP}$ are equal to zero in instances in which the 12-position filter described in detail with respect to FIG. 4 may be used. As such, the sub-pixel and coefficient symmetry described in this disclosure may be used in conjunction with or separately from the filter support techniques. When used in conjunction with the 12-position filter support described in FIG. 4, there are 6(a)+3(b)+6(d)+3(h)+12(e)+6(f)+6(i)+3(j)=45 unique coefficients for these sub-pixel positions that need to be sent to the decoder, i.e., 6 coefficients for the group including sub-pixel position "a," 3 coefficients for the group including sub-pixel position "b," 6 coefficients for the group including sub-pixel position "d," 3 coefficients for the group including sub-pixel position "h," 12 coefficients for the group including sub-pixel position "e," 6 coefficients for the group including sub-pixel position "f," 6 coefficients for the group including sub-pixel position "i," and 3 coefficients for the group including sub-pixel position "j."

Figure 17:
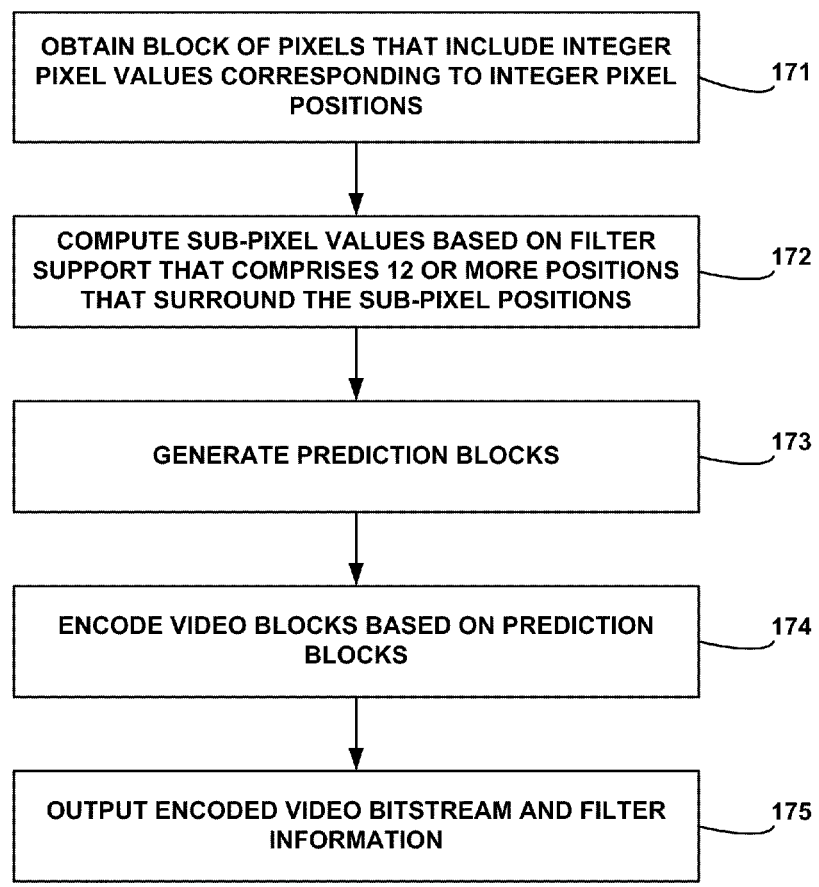
FIG. 17 is a flow diagram illustrating example operation of a video encoder that utilizes a twelve pixel filter support consistent with this disclosure.

FIG. 17 is a flow diagram illustrating example operation of a video encoder that utilizes a twelve pixel filter support consistent with this disclosure. The technique of FIG. 17 will be described from the perspective of video encoder 50 of FIG. 2 although other devices may perform similar techniques. As shown, in FIG. 17, MC unit 37 of prediction unit 32 obtains a block of pixels from memory 34 that include integer pixel values corresponding to integer pixel positions (171). Filter(s) 39 compute sub-pixel values based on a filter support that comprises twelve or more positions that surround the sub-pixel positions (172). As explained in greater detail above, the twelve-position filter support may be used to generate nine of the fifteen possible sub-pixel interpolations, while linear horizontal and linear vertical filtering may be used to generate six of the fifteen possible sub-pixel interpolations.

MC unit 37 then generates a prediction block based on the computed sub-pixel values (173). In particular, MC unit 37 may generate and output an interpolated prediction block comprising interpolated sub-pixel values. Adder 48 can then encode a current video block based on the interpolated prediction block (174), e.g., by subtracting the interpolated prediction block from the video block being encoded to generate a residual block. The residual block may then be transformed and quantized by transform unit 38 and quantization unit 40, respectively. Following entropy coding by entropy coding unit 46, video encoder 50 can output an encoded video bitstream and filter information (175). The filter information, as described herein, may comprise eight sets of coefficients used for generating all fifteen sets of coefficients for fifteen sub-pel positions. The filter information may be output once per coded unit, or possibly several times per coded unit if different areas of a coded unit use different types of sub-pel interpolation.

Figure 18:
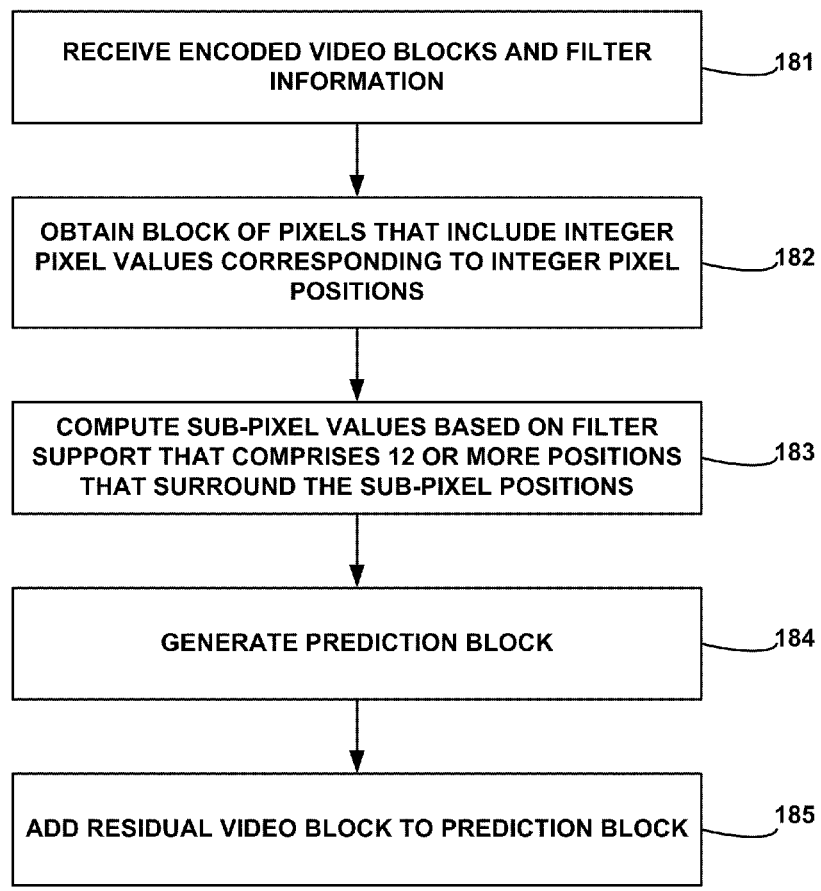
FIG. 18 is a flow diagram illustrating example operation of a video decoder that utilizes a twelve pixel filter support consistent with this disclosure.

FIG. 18 is a flow diagram illustrating example operation of a video decoder that utilizes a twelve pixel filter support consistent with this disclosure. Thus, the process of FIG. 18 may be considered the reciprocal decoding process to the encoding process of FIG. 17. FIG. 18 will be described from the perspective of video decoder 60 of FIG. 16 although other devices may perform similar techniques. As shown in FIG. 18, video decoder 60 receives an encoded video blocks and filter information (181). Entropy decoding unit 52 may entropy decode this received information. Prediction unit 55 performs interpolative motion compensation according to techniques of this disclosure. In particular, prediction unit 55 obtains a block of pixels from memory 62 that include integer pixel values corresponding to integer pixel positions (182). Prediction unit 55 may use received motion vectors to determine how to perform interpolation. Based on the motion vectors, prediction unit 55 can compute sub-pixel based on a filter support that comprises twelve or more positions that surround the sub-pixel positions (183). In this way, prediction unit 55 uses interpolation to generate the prediction block (184). The prediction block may be used to decode a residual video block by invoking adder 64 to add the prediction block to the residual block (185). The various aspects of interpolation described herein, including the use of a twelve position filter support that surrounds the sub-pixel positions in a radial shape, may improve video encoding by providing better quality interpolate data than conventional techniques.

Figure 19:
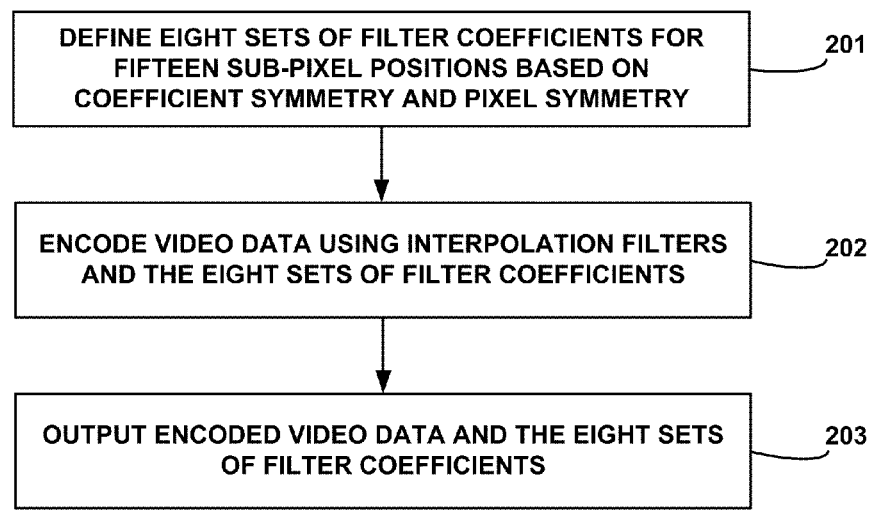
FIG. 19 is a flow diagram illustrating example operation of a video encoder that utilizes coefficient symmetry and pixel symmetry consistent with this disclosure.

FIG. 19 is a flow diagram illustrating example operation of a video encoder that utilizes coefficient symmetry and pixel symmetry consistent with this disclosure. The technique of FIG. 19 will be described from the perspective of video encoder 50 of FIG. 2 although other devices may perform similar techniques. As shown, in FIG. 19, prediction unit 32 of video encoder 50 defines eight sets of filter coefficients for fifteen sub-pixel positions based on coefficient symmetry and pixel symmetry, as described herein (201). In particular, prediction unit 32 may use pixel symmetry to reduce the sets of coefficients from fifteen to eight, and may further reduce the number of coefficients for some or all of the eight sets based on coefficient symmetry between coefficients of given sets. Prediction unit 32 can then encode video data using interpolation filters (such as filter(s) 39) and the eight sets of filter coefficients (202). Video encoder 50 may output encoded video data and the eight sets of filter coefficients (203). The eight sets of coefficients, which are encoded and output in the bitstream, may be sent with each coded unit (e.g., each frame or slice) so that a decoding device can be informed of the filter coefficients to use for interpolation. Alternatively, different groups of eight sets of coefficients may be encoded and sent with each coded unit to enable different types of interpolations at different locations within a coded unit.

Figure 20:
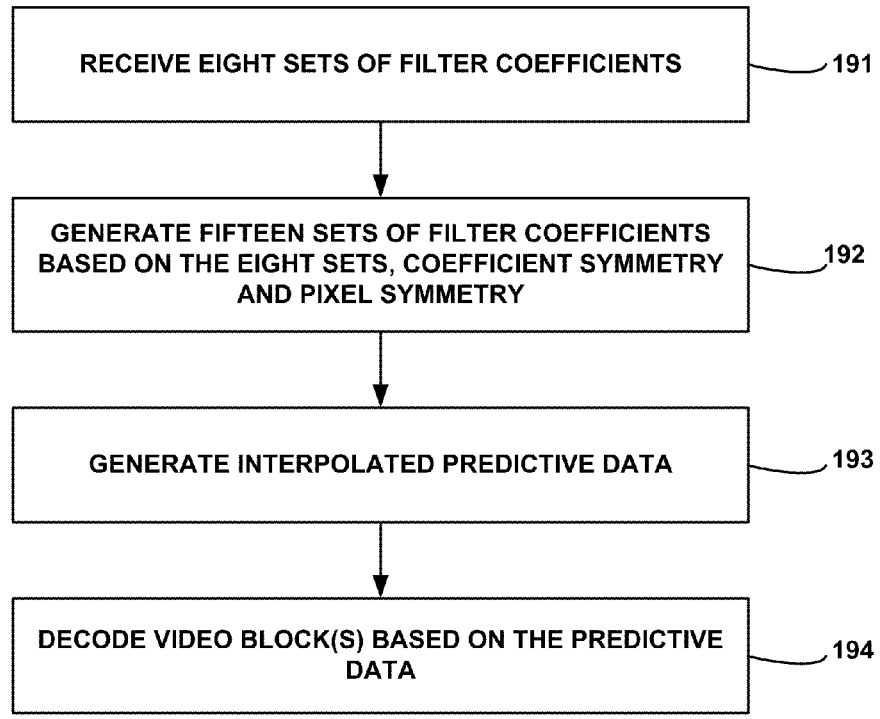
FIG. 20 is a flow diagram illustrating example operation of a video decoder that utilizes coefficient symmetry and pixel symmetry consistent with this disclosure.

FIG. 20 is a flow diagram illustrating example operation of a video decoder that utilizes coefficient symmetry and pixel symmetry consistent with this disclosure. In this case, prediction unit 55 of video decoder 60 receives eight sets of filter coefficients (191), and generates the fifteen sets of filter coefficients based on the eight sets, coefficient symmetry and pixel symmetry. Prediction unit 60 can then program its interpolation filters and apply such interpolation filters in order to properly generate interpolated predictive data (193). Video decoder 60 can then decode video blocks based on the predictive data (194), e.g., invoking adder 64 to add correct predictive data interpolated by prediction unit 55 to a residual block to be decoded.

Figure 21:
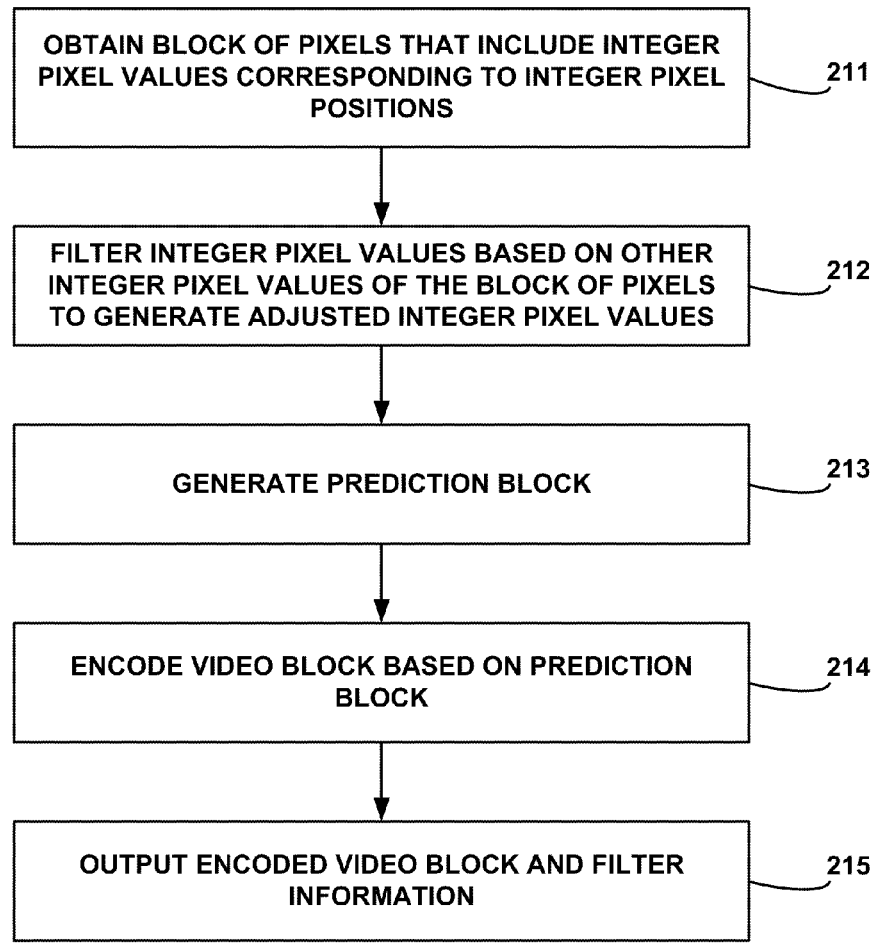
FIG. 21 is a flow diagram illustrating example operation of a video encoder that utilizes filtering of integer pixel locations to generate adjusted integer pixel values consistent with this disclosure.

FIG. 21 is a flow diagram illustrating example operation of a video encoder that utilizes filtering of integer pixel locations to generate adjusted integer pixel values consistent with this disclosure. This is discussed above as interpolation-like filtering insofar as it is similar to interpolations, but does not generate sub-integer values. Rather, this process generates new integer values that are filtered based on the original integer value and other integer values that surround the original integer value.

FIG. 21 will be described from the perspective of video encoder 50 of FIG. 2 although other devices may perform similar techniques. As shown, in FIG. 21, MC unit 37 of prediction unit 32 obtains a block of pixels from memory 34 that includes integer pixel values corresponding to integer pixel locations (211). Filter(s) 39 of prediction unit 32 filter the integer pixel values based on other integer pixel values of the block of pixels to generate adjusted integer pixel values (212). Prediction unit 32 generates a prediction block based on the adjusted integer pixel values (213), and video encoder 50 encodes a video block based on the prediction block (214), e.g., invoking adder 48 to subtract the prediction block from the video block being encoded to generate a residual block. Following, transformation and quantization of the residual block by transform unit 38 an quantization unit 40, and following entropy coding by entropy coding unit 46, video encoder 50 outputs the encoded video block and filter information (215). As with sub-pel interpolation, interpolation-like filtering with respect to integer pixel locations may involve the output and communication of filter information once per coded unit, or possibly several times per coded unit if different areas of a coded unit use different types of integer interpolation-like filtering.

Figure 22:
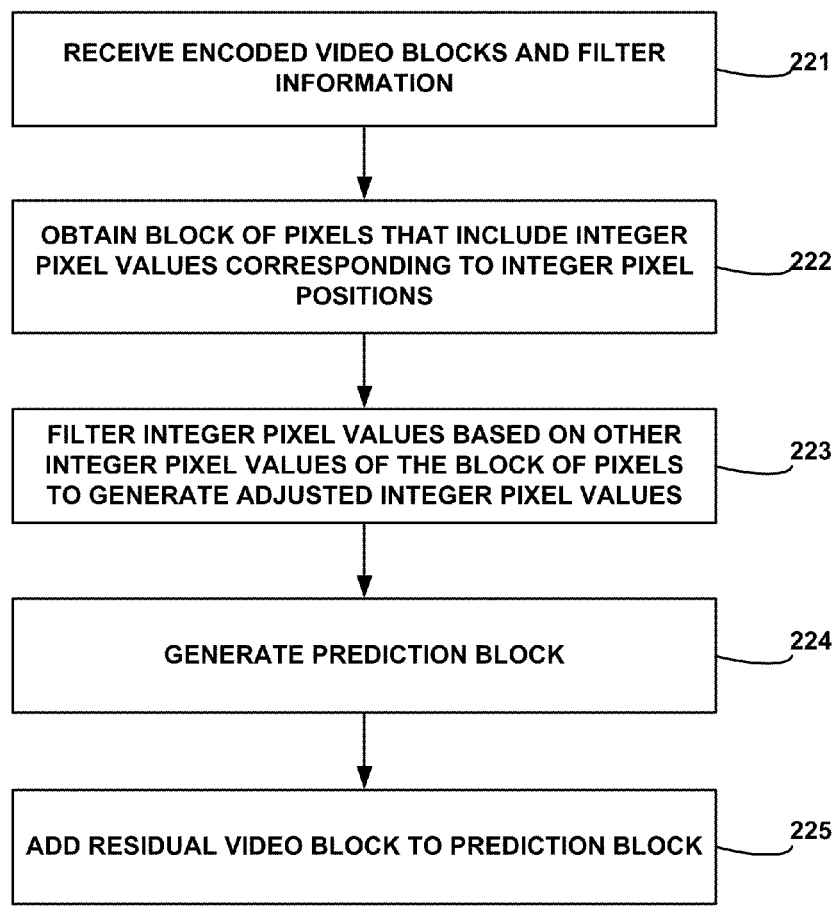
FIG. 22 is a flow diagram illustrating example operation of a video decoder that utilizes filtering of integer pixel locations to generate adjusted integer pixel values consistent with this disclosure.

FIG. 22 is a flow diagram illustrating example operation of a video decoder that utilizes filtering of integer pixel locations to generate adjusted integer pixel values consistent with this disclosure. Prediction unit 55 of video decoder 60 receives encoded video blocks, and also receives filter information (e.g., once per coded unit) (221). Prediction unit 55 obtains a block of pixels from memory 62 that include integer pixel values corresponding to integer pixel positions (222). Prediction unit 55 invokes a filter (not shown) as part of motion compensation to filter integer pixel values based on other integer pixel values of the block of pixels to generate adjusted integer pixel values (223). Prediction unit 55 generates a prediction block based on the adjusted integer pixel values (224). Video decoder 60 can then decode video blocks based on the prediction block e.g., invoking adder 64 to add the predictive block interpolated by prediction unit 55 to a residual video block to be decoded (225).

Figure 23:
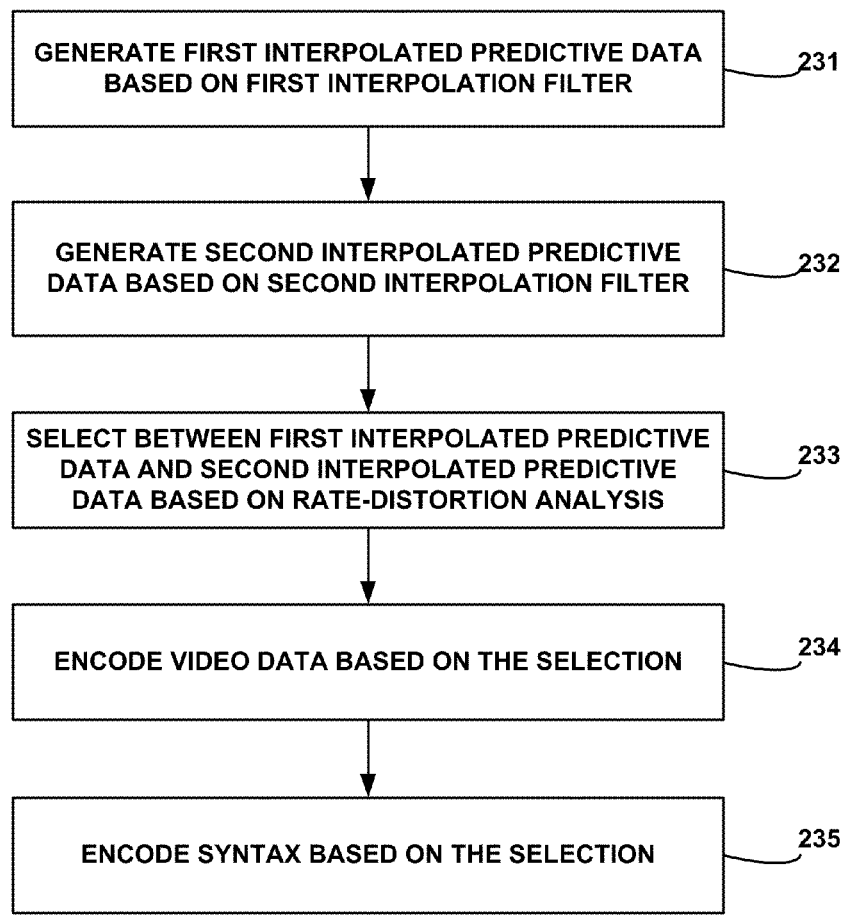
FIG. 23 is a flow diagram illustrating a technique for rate-distortion defined interpolation for video coding based on a fixed filter or an adaptive filter.

FIG. 23 is a flow diagram illustrating a technique for rate-distortion defined interpolation for video coding based on two sets of candidate filters. In this case, MC unit 37 of prediction unit 32 may generate two or more different sets of predictive data, one set based on the first set of candidate interpolation filters and another set based on the second set of candidate interpolation filters. MC unit 37 can then use a rate-distortion based analysis in order to select which interpolation filter will yield the best results from the perspective of rate and distortion. In this way, MC unit 37 not only considers which set of predictive data will yield the best results (i.e., the least distortion), but will also factor in the fact that one set of candidate filters may require less bit overhead in order to convey its filter coefficients to the decoder.

As shown in FIG. 23, MC unit 37 of prediction unit 32 generates first interpolated predictive data for encoding of video data based on a first interpolation filter (231). The first interpolation filter, in one example, comprises a fixed interpolation filter corresponding to a filter defined by a particular video coding standard, such as a filter that corresponds to an ITU-T H.264 interpolation filter. For added precision, in some cases, the fixed interpolation filter may correspond to an ITU-T H.264 interpolation filter without intermediate rounding of half-pixel values that are used to generate quarter-pixel values. In this case, the fixed interpolation filter may generate half-pixel values and may upwardly round such values for purposes of interpolation to the half-pixel resolution. However, to the extent that such half-pixel values will also be used for interpolation to quarter-pixel resolution, MC unit 37 may store non-rounded versions of the half-pixel values and use the non-rounded versions of the half-pixel values for any interpolation to quarter-pixel resolution. Co-pending and commonly assigned U.S. patent application Ser. No. 12/420, 235, filed for Karczewicz et al., and entitled "ADVANCED INTERPOLATION TECHNIQUES FOR MOTION COMPENSATION IN VIDEO CODING", which was filed on the same day as the present application, and which is incorporated herein by reference, provides many additional details on interpolation filtering without intermediate rounding of half-pixel values that are used to generate quarter-pixel values.

Next, MC unit 37 of prediction unit 32 generates second interpolated predictive data for video encoding of the video data based on a second interpolation filter (232). In one example, the second interpolation filter may comprise an adaptive interpolation filter. In this case, consistent with adaptive interpolation, MC unit 37 may define the filter coefficients to be used. In particular, MC unit 37 may execute an adaptive interpolation process in which MC unit 37 starts with pre-set filter coefficients, generates preliminary predictive data, and then adjusts the filter coefficients in an adaptive process so that such filter coefficients define more desirable predictive data.

Once the MC unit 37 of prediction unit 32 has generated both the first and the second interpolated predictive data, MC unit 37 can select between the first interpolated predictive data and the second interpolated predictive data based on a rate-distortion analysis (233). In this way, MC unit 37 not only considers which set of predictive data will yield the best results (i.e., the least distortion), but MC unit 37 also factors in the different amounts of data (i.e., the different bit rates) that will be required for the first interpolation filter relative to the second interpolation filter. Notably, if the fixed interpolation filter is used (e.g., as the first interpolation filter), video encoder 50 will not need to encode filter coefficients in the bitstream, whereas if the adaptive interpolation filter is used (e.g., as the second interpolation filter) video encoder 50 will need to encode filter coefficients. Accordingly, the rate-distortion analysis can determine which set of predictive data will yield the best results (i.e., the least rate distortion cost), by accounting for the fact that the use of the fixed interpolation filter does not require additional bits in order to convey filter coefficients to the decoder.

More specifically, selecting between the first interpolated predictive data and the second interpolated predictive data based on a rate-distortion analysis (233) may comprise calculating a first rate-distortion cost associated with the video data if the video data is encoded via the first interpolated predictive data, calculating a second rate-distortion cost associated with the video data if the video data is encoded via the second interpolated predictive data, and selecting between the first interpolated predictive data and the second interpolated predictive data based on the first and second rate-distortion costs.

The rate distortion cost associated with the video data if the video data is encoded via the first interpolated predictive data may comprise a first difference metric, e.g., mean squared error (MSE) of pixel values or sum of absolute difference (SAD) of pixel values or sum of squared difference (SSD) of pixel values indicative of differences between the video data and the first interpolated predictive data, plus a first value that quantifies cost associated with encoding of filter coefficients. In this case, if the first interpolation filter is a fixed interpolation filter, the first value that quantifies cost may be defined as zero. Similarly, the second rate-distortion cost may comprise a second difference metric indicative of differences between the video data and the second interpolated predictive data (MSE, SAD or SSD), plus a second value that quantifies cost associated with encoding of filter coefficients. In the case where the second interpolation filter is an adaptive interpolation filter, the second value that quantifies cost associated with encoding of filter coefficients may comprise the number of bits (r) needed to encode adaptive interpolation filter coefficients, or possibly this number (r) multiplied by a Lagrangian multiplier ($\lambda$).

After selecting between the first interpolated predictive data and the second interpolated predictive data based on a rate-distortion analysis (233), MC unit 37 of prediction unit 32 encodes the video data based on the selection (234), and encodes syntax to indicate the selection (235). The syntax may comprise a one-bit flag or a multi-bit flag that defines whether the first interpolation filter or the second interpolation filter should be used by a decoder. The process of FIG. 23 may be repeated for each of a plurality of sub-pixel locations for each coded unit of a video sequence to indicate whether the first interpolation filter or the second interpolation filter should be used by a decoder for each of the plurality of sub-pixel locations. The sub-pixel locations may comprise fifteen possible sub-pixel locations consistent with interpolation to quarter-pixel resolution, or may comprise a different number of sub-pixel locations. The process of FIG. 23 may also be repeated for the integer-pixel location for each coded unit of a video sequence to indicate whether the first interpolation filter or the second interpolation filter should be used by a decoder for the integer-pixel location.

Once video encoder 50 (FIG. 2) has encoded the video data based on the selection (234), and encoded syntax to indicate the selection (235), modem 23 and transmitter 24 (FIG. 1) may modulate and transmit the encoded video data and the syntax to destination device 17. In the case where the first interpolation filter is fixed and the second interpolation filter is adaptive, transmitter 24 may transmit filter coefficients when the syntax indicates that the second interpolated predictive data was used to generate the encoded video data, but may transmit no filter coefficients when the syntax indicates that the first interpolated predictive data was used to generate the encoded video data. In this way, when the first interpolation filter is fixed and the second interpolation filter is adaptive, filter coefficients are only sent if the syntax indicates that adaptive interpolation filtering was used, and the decision whether or not to use adaptive interpolation filtering considers not only the predictive video quality, but also the bit rate, which is affected by the presence of filter coefficients in the transmitted bitstream. In other examples, however, the first and second interpolation filters may both be fixed, or may both be adaptive.

The techniques of this disclosure may be applied in many scenarios, including scenarios when there are more than two sets of filters being selected by the encoder. In other words, additional interpolation filters may also be applied to generate additional interpolated predictive data, which may also be considered in the rate distortion analysis. In other words, the method is not limited to generating only first and second interpolated predictive data based on two interpolation filters, but could be applied to generate any plurality of interpolated predictive data based on any number of interpolation filters. Importantly, a rate-distortion analysis interpolated predictive data is used to identify which filter to select. In one example, a method executed by video encoder 50 may comprise generating a plurality of different versions of predictive data for encoding of video data based on a plurality of different interpolation filters, selecting among the plurality of different versions of predictive data based on a rate distortion analysis, encoding the video data based on the selection, and encoding syntax to indicate the selection.

In addition to selecting the interpolation filter based on a rate-distortion analysis, and generating syntax to indicate the selection, MC unit 37 of prediction unit 32 may also conduct a similar rate-distortion analysis with respect to integer pixel filtering, which is explained in more detail above. In particular, MC unit 37 of prediction unit 32 may generate two or more different sets of predictive data for integer pixel locations, e.g., one with integer pixel filtering and one without integer pixel filtering, and may conduct a rate-distortion analysis with respect to these two different sets in order to determine whether integer pixel filtering is desired. Accordingly, MC unit 37 of prediction unit 32 may generate another syntax element based on a rate-distortion analysis associated with two different sets of integer predictive data to indicate whether integer pixel filtering should be applied for the coded unit, wherein a first set of the integer predictive data is non-filtered and a second set of the integer predictive data is filtered. In this way, the decision whether to conduct integer pixel filtering may be based on not only the quality of video coding, but also the possible bit overhead associated with integer pixel filtering, particularly when integer pixel filtering would involve the encoding and sending of integer pixel filter coefficients used to perform such integer pixel filtering. Integer filtering may also consider N integer filters (e.g., where N is any positive and plural integer. Consistent with the use of N integer filters, the example above would correspond to the case where N is two and one of the filters does not apply any filtering.

Whenever interpolation filter coefficients are actually encoded and sent from source device 12 to destination device 16, this disclosure also contemplates techniques for coding such interpolation filter coefficients. The described encoding for filter coefficients can improve data compression. In particular, this disclosure contemplates prediction techniques for filter coefficients, e.g., relative to fixed filter coefficients. In addition, this disclosure contemplates prediction techniques for a second set of filter coefficients relative to first set of filter coefficients. In these ways, imperfect symmetry between different filter coefficients may be exploited to allow for data compression. In addition to the use of such prediction techniques for interpolation filter coefficients, this disclosure also provides for useful quantization techniques and entropy coding of interpolation filter coefficients based on prefix and suffix coding. The following discussion provides more details on these aspects of this disclosure.

Figure 24:
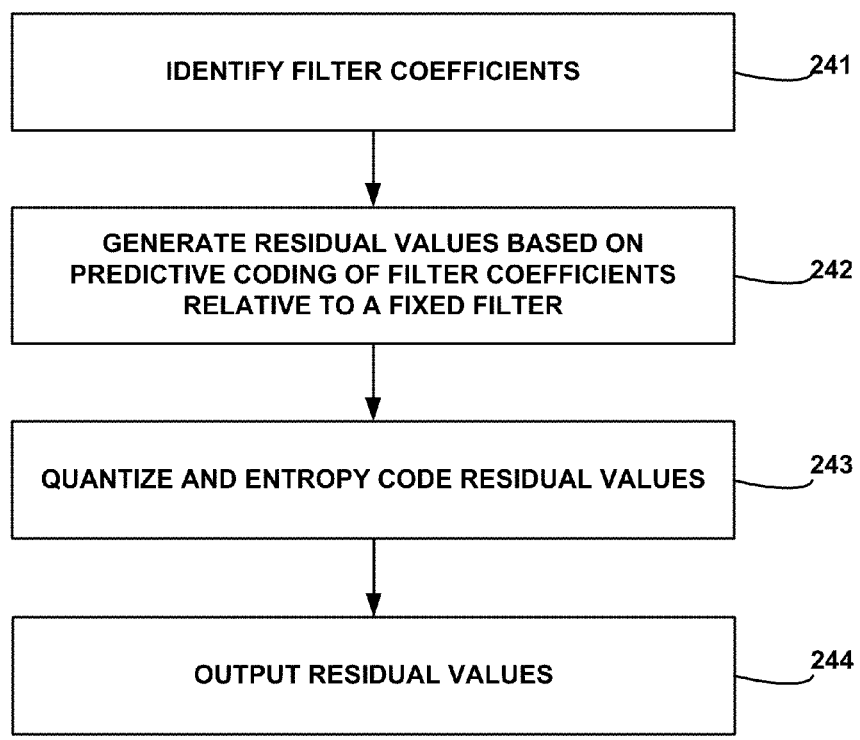
FIG. 24 is a flow diagram illustrating a technique for encoding filter coefficients using predictive coding.

FIG. 24 is a flow diagram illustrating a technique for encoding filter coefficients using predictive coding. In this case, filter coefficients used by video encoder 50 may be predictively encoded relative to filter coefficients of a fixed filter, which may further improve data compression when filter coefficients are sent as part of an encoded bitstream.

As shown in FIG. 24, MC unit 37 of prediction unit 32 identifies a set of filter coefficients for interpolation of predictive data in video encoding (241). For example, MC unit 37 may identify the set of filter coefficients by performing an adaptive interpolation filtering process. In this case, MC unit 37 may determine the set of filter coefficients via the adaptive interpolation filtering process and generate the predictive data based on the filter coefficients identified in the adaptive interpolation filtering process. In adaptive interpolation filtering, as explained in greater detail herein, MC unit 37 may perform a two-pass approach in which predictive data is generated based on a fixed filter, and then the filter coefficients are adjusted so that the predictive data is made to be more similar to the video data being coded. The adjusted filter coefficients, then, define the filter coefficients that are used and encoded into the bitstream.

In order to encode the filter coefficients so that such filter coefficients may be transmitted as part of a bitstream, coefficient prediction and quantization unit 41 may generate residual values associated with the set of filter coefficients based on predictive coding of the set of filter coefficients relative to filter coefficients associated with a fixed interpolation filter (242). In particular, coefficient prediction and quantization unit 41 may subtract the filter coefficients determined in the adaptive interpolation filtering process from corresponding filter coefficients associated with a fixed filter, such as an ITU-T H.264 interpolation filter, or an ITU-T H.264 interpolation filter without intermediate rounding of half-pixel values. By encoding and transmitting residual values, rather than transmitting the actual filter coefficients, the amount of data communicated in the bistream can be reduced. In this case, the decoder may be programmed to know the manner in which the filter coefficients are encoded.

Video encoder 50 may invoke coefficient prediction and quantization unit 41 to both predict and quantize the residual coefficients, and entropy coding unit 46 may entropy code the quantized residuals (243). Video encoder 50 can then output the residual values as part of the encoded bitstream (244). The quantization of residual values associated with the filter coefficients may involve quantizing the residual values, wherein at least some of the residual values associated with different filter coefficients are assigned different levels of quantization. In this way, coefficient prediction and quantization unit 41 may assign more quantization to larger residual coefficients, and may assign less quantization to finer residual coefficients in order to achieve a desirable balance of quantization and accuracy. When more quantization is used, more data is eliminated but more compression may be achieved. Entropy coding unit 46 may entropy code the residual values by assigning a prefix code, assigning a suffix code and assigning a sign value for the residual values following quantization of the residual values. Video encoder 50 can then output the residual values as part of the encoded bitstream (244).

Figure 27:
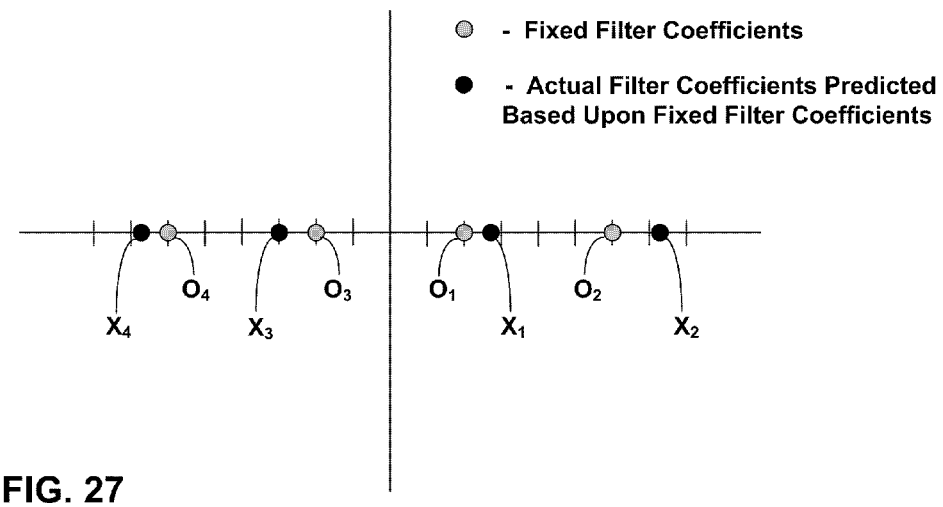
FIGS. 27 and 28 are conceptual graphs illustrating filter coefficients that can be predictively coded.

FIG. 27 is a conceptual graph illustrating some illustrative filter coefficients that can be predictively coded. In this case, filter coefficients $O_1$, $O_2$, $O_3$ and $O_4$ may define filter coefficients associated with a fixed interpolation filter. Filter coefficients $X_1$, $X_2$, $X_3$ and $X_4$ may define the desired filter coefficients, which may be fairly similar to those of the fixed interpolation filter. Accordingly, filter coefficients $X_1$, $X_2$, $X_3$ and $X_4$ may be predicted based on filter coefficients $O_1$, $O_2$, $O_3$ and $O_4$ respectively. In particular, a first residual may be formed as the difference between $X_1$ and $O_1$. Similarly, a second residual may be formed as the difference between $X_2$ and $O_2$, a third residual may be formed as the difference between $X_3$ and $O_3$, and a fourth residual may be formed as the difference between $X_4$ and $O_4$. The residuals may comprise less data than the original filter coefficients, thereby promoting data compression.

In some cases, the set of filter coefficients comprises a first set of filter coefficients that define only a portion of an entire set of filter coefficients associated with an adaptive interpolation filter, wherein a second set of filter coefficients can be determined by a decoder based on the first set of filter coefficients and coefficient symmetry. For example, filter coefficients $X_1$ and $X_2$ may be predictively encoded based on $O_1$ and $O_2$ respectively. In this case, however, $X_3$ and $X_4$ may be symmetric with $X_1$ and $X_2$ and the decoder may be programmed to know that such symmetry is imposed. Accordingly, through the use of symmetry, coefficients $X_3$ and $X_4$ in this simple example, may be eliminated from the bistream, and may be calculated at the decoder based on known coefficient symmetry once coefficients $X_1$ and $X_2$ are predictively decoded.

Figure 25:
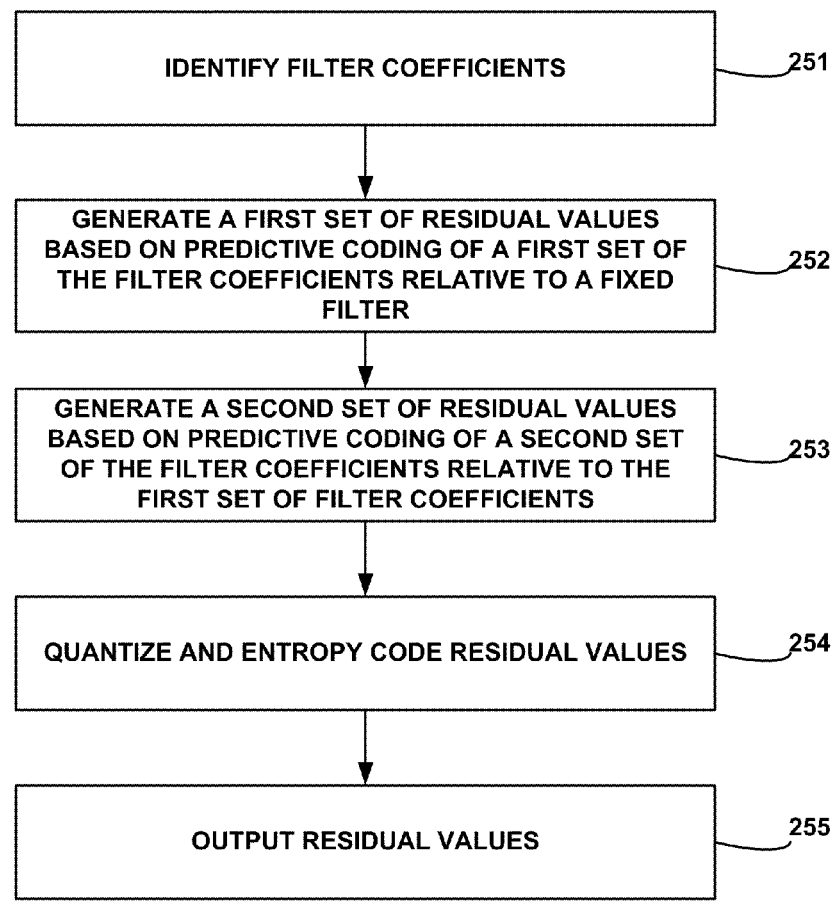
FIG. 25 is another flow diagram illustrating a technique for encoding filter coefficients using predictive coding.

FIG. 25 is another flow diagram illustrating a technique for encoding filter coefficients using predictive coding. In this case, however, two different types of prediction are used. As shown in FIG. 25, MC unit 37 of prediction unit 32 identifies a set of filter coefficients for interpolation of predictive data in video encoding (251). As with the process of FIG. 24, in FIG. 25, MC unit 37 may identify the set of filter coefficients by performing an adaptive interpolation filtering process. In this case, MC unit 37 may determine the set of filter coefficients via the adaptive interpolation filtering process and generate the predictive data based on the filter coefficients identified in the adaptive interpolation filtering process. In adaptive interpolation filtering, MC unit 37 may perform a two-pass approach in which predictive data is generated based on a fixed filter, and then the filter coefficients are adjusted so that the predictive data is made to be more similar to the video data being coded. The adjusted filter coefficients, then, define the filter coefficients that are used and encoded into the bitstream.

In order to encode the filter coefficients so that such filter coefficients may be transmitted as part of a bitstream, coefficient prediction and quantization unit 41 may generate a first set of residual values associated with a first set of the filter coefficients based on predictive coding relative to filter coefficients associated with a fixed interpolation filter (252). In particular, coefficient prediction and quantization unit 41 may subtract the first set of filter coefficients from corresponding filter coefficients associated with a fixed filter, such as an ITU-T H.264 interpolation filter, or an ITU-T H.264 interpolation filter without intermediate rounding of half-pixel values. Next, coefficient prediction and quantization unit 41 may generate a second set of residual values associated with a second set of the filter coefficients based on predictive coding relative to the first set of filter coefficients (253). In particular, coefficient prediction and quantization unit 41 may subtract the second set of filter coefficients from mirrored or rotated values of the first set of coefficients. Thus, the first set of coefficients are predictively coded based on the coefficients of a fixed filter, and the second set of coefficients are predictively coded based on the first set of coefficients. By generating residual values rather than using the actual filter coefficients, the amount of data communicated in the bistream can be reduced. Furthermore, by using the fixed filter to predict the first set of coefficients and then using the first set of coefficients to predict the second set of coefficients, further data compression may be achieved relative to prediction that relies only on the fixed filter.

As with the process of FIG. 24, in FIG. 25, video encoder 50 may invoke coefficient prediction and quantization unit 41 to both predictively code and quantize the residual coefficients, and entropy coding unit 46 may entropy code the quantized residuals (254). Video encoder 50 can then output the residual values as part of the encoded bitstream (254). Again, the quantization of residual values associated with the filter coefficients may involve quantizing the residual values, wherein at least some of the residual values associated with different filter coefficients are assigned different levels of quantization. In this way, coefficient prediction and quantization unit 41 may assign more quantization to larger residual coefficients, and may assign less quantization to finer residual coefficients in order to achieve a desirable balance of quantization and accuracy. Entropy coding unit 46 may entropy code the residual values by assigning a prefix code, assigning a suffix code and assigning a sign value for the residual values following quantization of the residual values. Video encoder 50 can then output the residual values as part of the encoded bitstream (255).

Figure 28:
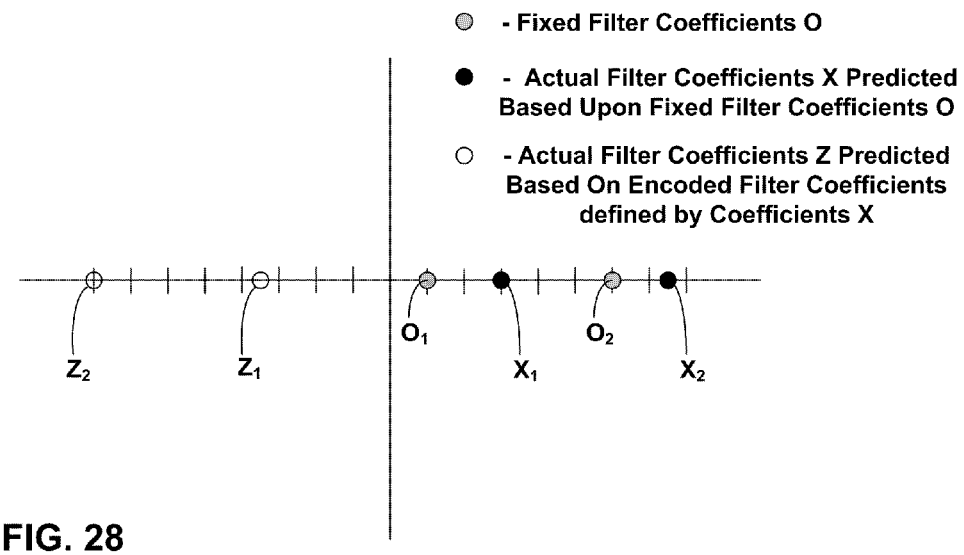

FIG. 28 is a conceptual graph illustrating some illustrative filter coefficients that can be predictively coded consistent with the process of FIG. 25. In this case, filter coefficients $O_1$ and $O_2$ may define filter coefficients associated with a fixed interpolation filter. Filter coefficients $X_1$ and $X_2$ may define a first set of the desired filter coefficients, which may be fairly similar to those of the fixed interpolation filter. Accordingly, filter coefficients $X_1$ and $X_2$ may be predicted based on filter coefficients $O_1$ and $O_2$ respectively. In particular, a first residual may be formed as the difference between $X_1$ and $O_1$, and a second residual may be formed as the difference between $X_2$ and $O_2$. The residuals may comprise less data than the original filter coefficients, thereby promoting data compression. The residuals are then quantized by coefficient prediction and quantization unit 41 and entropy coded by entropy coding unit 46. $\hat{X}_1$ and $\hat{X}_2$ may refer to modified filter coefficients that are generated by adding the dequantized residuals to the prediction filter coefficients $O_1$ and $O_2$.

Next, a second set of filter coefficients $Z_1$ and $Z_2$ may be predictively coded based on the first set of coefficients $X_1$ and $X_2$, e.g., specifically from coefficients $\hat{X}_1$ and $\hat{X}_2$ which are defined based on coefficients $X_1$ and $X_2$. In particular, a third residual may be formed as the difference between $Z_1$ and $\hat{X}_1$, and a fourth residual may be formed as the difference between $Z_2$ and $\hat{X}_2$. $\hat{X}_1$ and $\hat{X}_2$ may be more similar to $Z_1$ and $Z_2$ than $O_1$ and $O_2$ and therefore, by using $\hat{X}_1$ and $\hat{X}_2$ to predictively encode $Z_1$ and $Z_2$ further data compression may be promoted.

Figure 26:
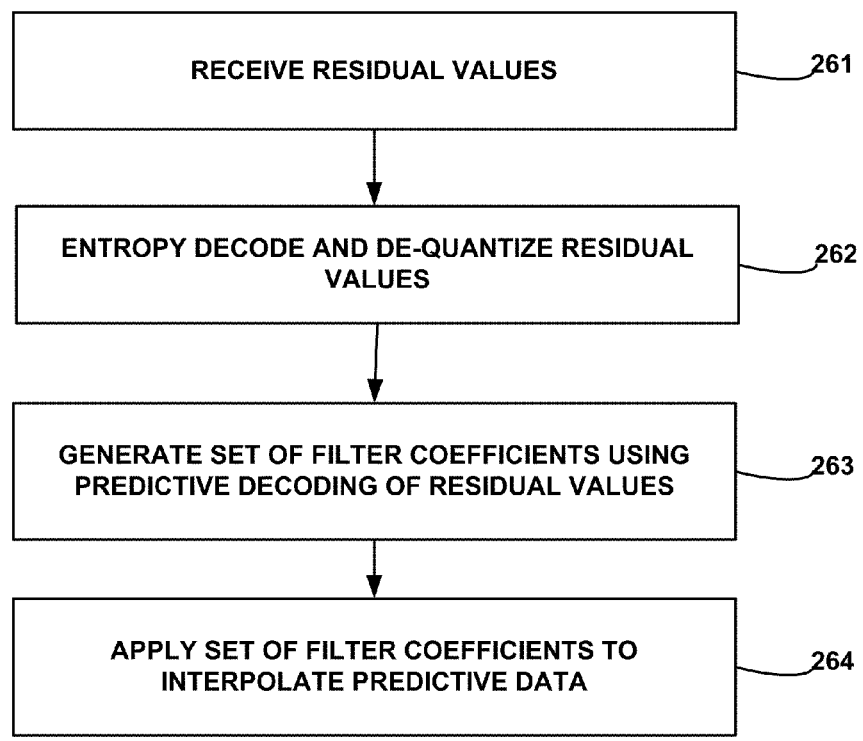
FIG. 26 is a flow diagram illustrating a technique for decoding filter coefficients using predictive coding.

FIG. 26 is a flow diagram illustrating a technique for decoding filter coefficients using predictive coding. FIG. 26 will be described from the perspective of video decoder 60 of FIG. 16. As shown video decoder 60 receives residual values associated with a set of filter coefficients (261). Video decoder 60 may entropy decode the residual values via entropy decoding unit 52, and may invoke coefficient prediction and inverse quantization unit 53 to de-quantize the residual values (262), which are then sent to prediction unit 55. Prediction unit 56 generates the set of filter coefficients using predictive decoding of the residual values (263).

In particular, prediction unit 56 may generate the entire set of filter coefficients based on the residual values and filter coefficients associated with a fixed interpolation filter, e.g., as conceptually illustrated in FIG. 27 and addressed above in the context of encoding. In some cases, a first set of filter coefficients may be generated based on the residual values and filter coefficients associated with a fixed interpolation filter, and a second set of filter coefficients may be generated based on symmetry. In other cases, a first set of filter coefficients may be generated based on the residual values and filter coefficients associated with a fixed interpolation filter, and a second set of filter coefficients may be generated based on additional residual values and the first set of filter coefficients, e.g., as conceptually illustrated in FIG. 28 and addressed above in the context of encoding. In any case, prediction unit 56 of video decoder 60 applies the set of filter coefficients to interpolate predictive data used for predictive decoding of video blocks (264). In particular, prediction unit 56 filters data to generate interpolated predictive data using the predictively decoded filter coefficients so that video blocks can be decoded based on such interpolated predictive data.

Again, the set of predictively decoded filter coefficients may comprise a first set of filter coefficients that define only a portion of an entire set of filter coefficients associated with an adaptive interpolation filter. In this case, coefficient prediction and inverse quantization unit 53 of video decoder 60 may generate a second set of filter coefficients based on the first set of filter coefficients and coefficient symmetry, and apply the first and second sets of filter coefficients to interpolate the predictive data.

In another case, the set of predictively decoded filter coefficients may comprises a first set of filter coefficients that define only a portion of an entire set of filter coefficients associated with an adaptive interpolation filter. In this case, video decoder 60 may receive additional residual values associated with the entire set of filter coefficients. Coefficient prediction and inverse quantization unit 53 may generate a second set of filter coefficients using predictive decoding based on additional residual values and the first set of filter coefficients, and prediction unit 55 may apply the first and second sets of filter coefficients to interpolate the predictive data.

In some cases, fixed interpolation filters based on H.264/AVC filters may be used to predict the 1-D filters (which may include filters for the sub-pixel positions a, b, d, h shown in FIGS. 8, 9, 10 and 11). For the 2-D filters, which include filters for the sub-pixel positions e, f, i, and j shown in FIGS. 12, 13, 14 and 15, one of the following prediction schemes may be used:

1. Set prediction to zero (no prediction), $p(h_{i,j}^{SP})=0$, $SP\epsilon\{e, f,i,j\}$
2. Use a fixed filter prediction, such as the average filter gathered over a training set, i.e., $p(h_{i,j}^{SP})=\bar{h}_{i,j}^{SP}$, $SP\epsilon\{e, f,i,j\}$, where $\bar{h}_{i,j}^{SP}$ is the (i,j)-th filter coefficient in the average filter for sub-pixel position SP.
3. Exploit the possible symmetry in the coefficients and use the already coded coefficients to predict the remaining coefficients.

For the 1-D filters, any of these three prediction methods may also be applied.

For prediction, FIG. 29 provides an example of an array of integer-pixel filter coefficients for which prediction techniques may be used for encoding. In this example, it may be assumed that no symmetry is imposed on the integer-pixel filter. Coefficients (h0,0), (h0,1), (h1,0), (h1,1), (h2,0), (h2,1) (h0,2), (h1,2) and (h2,2) may be quantized and coded first. Then, the already coded top-left coefficients (h0,0), (h0,1), (h1,0), (h1,1) and (h2,0) may be used to predict the top-right coefficients (h0,3), (h1,3), (h2,3), (h0,4), (h1,4), and (h2,4). Next, once the top half of the filter coefficients (h0,0), (h0,1), (h0,2), (h0,3) (h0,4), (h1,0), (h1,1), (h1,2), (h1,3) and (h1,4) are quantized and coded, they may be further used to predict the bottom half of the filter coefficients (h3,0), (h3,1), (h3,2), (h3,3), (h3,4), (h4,0), (h4,1), (h4,2), (h4,3) and (h4,4). Prediction of filter coefficients may be done in a similar fashion. For example, for the sub-pixel position "e" filter (see FIG. 12), which may have some symmetry diagonally, the top-right coefficients may be quantized and coded first, and then used to predict the bottom-left coefficients.

In any case, after prediction of the coefficients (e.g., by coefficient prediction and quantization unit 41 of prediction unit 32), prediction errors are quantized (e.g., by coefficient prediction and quantization unit 41). As outlined above, so-called "uneven quantization" may be used. In this case, the quantization precision applied by coefficient prediction and quantization unit 41 may depend on the coefficient location. It has been found that for coefficients with smaller magnitude (which are typically coefficients farther away from the center of the filter), better precision may be desirable. In contrast, coefficients with larger magnitude (which are typically coefficients closer to the center of the filter), less precision is more desirable.

The following matrices, $Q^{1D}$, $Q^{2D}$, $Q^{FP}$, may be used by coefficient prediction and quantization unit 41 to specify the quantization precision for coefficients in the 1D filters, the 2D filters, and the integer-pixel filter, respectively. Note that the numbers of bits given in the matrices may include 1 bit to encode the sign of the respective coefficients.

$$Q^{1D} = [12 \ 11 \ 9 \ 9 \ 11 \ 12]$$

$$Q^{2D} = \begin{bmatrix} 0 & 10 & 10 & 0 \\ 10 & 9 & 9 & 10 \\ 10 & 9 & 9 & 10 \\ 0 & 10 & 10 & 0 \end{bmatrix}$$

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

Coefficient prediction and quantization unit 41 may code the quantized coefficient prediction errors i.e., the coefficient residuals, based on a simple prefix coding scheme. First, the dynamic range of the magnitude of the prediction error is divided into N bins, for example N=6. If the dynamic range of the magnitude is $[0, \ldots, 2^{q-1}-1]$, where q is the quantization precision for the given coefficient position, (such as specified in the matrices above) then each bin n, n=0, ... N−1, may span the following ranges:

$$[n_{start}, n_{end}) = [0, \ldots, 2^{q-N})$$

$$[n_{start}, n_{end}) = [2^{q-N+n-1}, 2^{q-N+n}), \text{ if } n=0 \ n>0$$

In this case, the bin b, b=0, ..., N−1, to which the input magnitude m belongs, may be coded using a unary prefix code (which takes b+1 bits). Then, the remainder of the magnitude, $m-b_{start}$, may be coded using fixed length suffix code of (q−N+b−1) bits. Finally, the sign of the prediction error is coded using 1 bit.

For example, for the center coefficient in the 1D filter, 9 bits precision may be used by coefficient prediction and quantization unit 41 to quantize the prediction error, i.e., q=9, of which 8 bits may be used to quantize the error magnitude. If the error magnitude is 97, then it falls within the 4th bin, i.e., b=4. Therefore, the unary prefix code "11110" may be encoded to indicate the 4th bin, and the remainder of $m-b_{start}=97-64=33$ may be encoded using a fixed length suffix code of (q−N+b−1)=(9−6+4−1)=6 bits. Finally, a bit "0" can be encoded to indicate positive sign.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method comprising:
receiving eight sets of filter coefficients as part of an encoded video bitstream;
generating fifteen sets of filter coefficients corresponding to fifteen different sub-pixel locations based on the eight sets of filter coefficients, wherein the fifteen sets of filter coefficients are used for interpolation filtering during motion compensation, and wherein at least one set of filter coefficients defines a two-dimensional filter support with a radial shape;
generating interpolated predictive data for video decoding based on one of the fifteen sets of filter coefficients, wherein the interpolated predictive data corresponds to one of the fifteen different sub-pixel locations; and
decoding one or more video blocks based on the interpolated predictive data.

2. The method of claim 1, wherein at least some of the eight sets of filter coefficients have coefficient symmetry such that a given set with coefficient symmetry comprise a subset of the filter coefficients associated with a filter support for a given sub-pixel location associated with the given set.

3. The method of claim 2, wherein the coefficient symmetry exists in a horizontal dimension and a vertical dimension but does not exist in a diagonal dimension for at least some of the subset of the filter coefficients.

4. The method of claim 1, further comprising generating the fifteen sets of filter coefficients based at least in part on pixel symmetry between two or more different sub-pixel locations.

5. The method of claim 1, further comprising generating the fifteen sets of filter coefficients based at least in part on pixel symmetry between two or more different sub-pixel locations, and based at least in part on coefficient symmetry defined for a given set such that the given set with coefficient symmetry comprise a subset of the filter coefficients associated with a filter support for a given sub-pixel location associated with the given set.

6. The method of claim 1, wherein the fifteen sets correspond to every half-pel and quarter-pel sub-pixel location.

7. The method of claim 1, wherein pixel symmetry exists between different ones of the fifteen sets of filter coefficients in a vertical dimension and in a horizontal dimension, but pixel symmetry does not exist in a diagonal dimension for at least some of the fifteen sets of filter coefficients.

8. The method of claim 1, wherein two of the eight sets define three of the fifteen sets for a horizontal filter support, two of the eight sets define three of the fifteen sets for a vertical filter support, and four of the eight sets define nine of the fifteen sets for a two-dimensional filter support.

9. The method of claim 8, wherein the two-dimensional support comprises 12 filter support positions surrounding nine sub-pixel positions.

10. A method comprising:
defining eight sets of filter coefficients for fifteen sub-pixel positions based on coefficient symmetry and pixel symmetry, wherein the filter coefficients are used for interpolation filtering during motion compensation, and wherein at least one set of filter coefficients defines a two-dimensional filter support with a radial shape;
encoding video data using interpolation filters and the eight sets of filter coefficients; and
outputting the eight sets of filter coefficients as part of an encoded bitstream.

11. The method of claim 10, further comprising outputting the eight sets of filter coefficients for every coded unit of the encoded bitstream.

12. The method of claim 10, wherein the fifteen sub-pixel positions correspond to every half-pel and quarter-pel sub-pixel location, and the eight sets, the coefficient symmetry and the pixel symmetry define filter supports for every half-pel and quarter-pel sub-pixel location.

13. An apparatus comprising a video decoder that:
receives eight sets of filter coefficients as part of an encoded video bitstream;
generates fifteen sets of filter coefficients corresponding to fifteen different sub-pixel locations based on the eight sets of filter coefficients, wherein the fifteen sets of filter coefficients are used for interpolation filtering during motion compensation, and wherein at least one set of filter coefficients defines a two-dimensional filter support with a radial shape;
generates interpolated predictive data for video decoding based on one of the fifteen sets of filter coefficients, wherein the interpolated predictive data corresponds to one of the fifteen different sub-pixel locations; and
decodes one or more video blocks based on the interpolated predictive data.

14. The apparatus of claim 13, wherein at least some of the eight sets of filter coefficients have coefficient symmetry such that a given set with coefficient symmetry comprise a subset of the filter coefficients associated with a filter support for a given sub-pixel location associated with the given set.

15. The apparatus of claim 14, wherein the coefficient symmetry exists in a horizontal dimension and a vertical dimension but does not exist in a diagonal dimension for at least some of the subset of the filter coefficients.

16. The apparatus of claim 13, wherein the video decoder generates the fifteen sets of filter coefficients based at least in part on pixel symmetry between two or more different sub-pixel locations.

17. The apparatus of claim 13, wherein the video decoder generates the fifteen sets of filter coefficients based at least in part on pixel symmetry between two or more different sub-pixel locations, and based at least in part on coefficient symmetry defined for a given set such that the given set with coefficient symmetry comprise a subset of the filter coefficients associated with a filter support for a given sub-pixel location associated with the given set.

18. The apparatus of claim 13, wherein the fifteen sets correspond to every half-pel and quarter-pel sub-pixel location.

19. The apparatus of claim 13, wherein pixel symmetry exists between different ones of the fifteen sets of filter coefficients in a vertical dimension and in a horizontal dimension, but pixel symmetry does not exist in a diagonal dimension for at least some of the fifteen sets of filter coefficients.

20. The apparatus of claim 13, wherein two of the eight sets define three of the fifteen sets for a horizontal filter support, two of the eight sets define three of the fifteen sets for a vertical filter support, and four of the eight sets define nine of the fifteen sets for a two-dimensional filter support.

21. The apparatus of claim 20, wherein the two-dimensional support comprises 12 filter support positions surrounding nine sub-pixel positions.

22. The apparatus of claim 13, wherein the video decoder comprises an integrated circuit.

23. The apparatus of claim 13, wherein the video decoder comprises a microprocessor.

24. The apparatus of claim 13, wherein the apparatus comprises a wireless communication device that includes the video decoder.

25. An apparatus comprising a video encoder that:
defines eight sets of filter coefficients for fifteen sub-pixel positions based on coefficient symmetry and pixel symmetry, wherein the filter coefficients are used for interpolation filtering during motion compensation, and wherein at least one set of filter coefficients defines a two-dimensional filter support with a radial shape;
encodes video data using interpolation filters and the eight sets of filter coefficients; and
outputs the eight sets of filter coefficients as part of an encoded bitstream.

26. The apparatus of claim 25, wherein the apparatus outputs the eight sets of filter coefficients for every coded unit of the encoded bitstream.

27. The apparatus of claim 25, wherein the fifteen sub-pixel positions correspond to every half-pel and quarter-pel sub-pixel location, and the eight sets, the coefficient symmetry and the pixel symmetry define filter supports for every half-pel and quarter-pel sub-pixel location.

28. The apparatus of claim 25, wherein the video encoder comprises an integrated circuit.

29. The apparatus of claim 25, wherein the video encoder comprises a microprocessor.

30. The apparatus of claim 25, wherein the apparatus comprises a wireless communication device that includes the video encoder.

31. A device comprising:
means for receiving eight sets of filter coefficients as part of an encoded video bitstream;
means for generating fifteen sets of filter coefficients corresponding to fifteen different sub-pixel locations based on the eight sets of filter coefficients, wherein the fifteen sets of filter coefficients are used for interpolation filtering during motion compensation, and wherein at least one set of filter coefficients defines a two-dimensional filter support with a radial shape;
means for generating interpolated predictive data for video decoding based on one of the fifteen sets of filter coefficients, wherein the interpolated predictive data corresponds to one of the fifteen different sub-pixel locations; and
means for decoding one or more video blocks based on the interpolated predictive data.

32. The device of claim 31, wherein at least some of the eight sets of filter coefficients have coefficient symmetry such that a given set with coefficient symmetry comprise a subset of the filter coefficients associated with a filter support for a given sub-pixel location associated with the given set.

33. The device of claim 32, wherein the coefficient symmetry exists in a horizontal dimension and a vertical dimension but does not exist in a diagonal dimension for at least some of the subset of the filter coefficients.

34. The device of claim 31, further comprising means for generating the fifteen sets of filter coefficients based at least in part on pixel symmetry between two or more different sub-pixel locations.

35. The device of claim 31, further comprising means for generating the fifteen sets of filter coefficients based at least in part on pixel symmetry between two or more different sub-pixel locations, and based at least in part on coefficient symmetry defined for a given set such that the given set with coefficient symmetry comprise a subset of the filter coefficients associated with a filter support for a given sub-pixel location associated with the given set.

36. The device of claim 31, wherein the fifteen sets correspond to every half-pel and quarter-pel sub-pixel location.

37. The device of claim 31, wherein pixel symmetry exists between different ones of the fifteen sets of filter coefficients in a vertical dimension and in a horizontal dimension, but pixel symmetry does not exist in a diagonal dimension for at least some of the fifteen sets of filter coefficients.

38. The device of claim 31, wherein two of the eight sets define three of the fifteen sets for a horizontal filter support, two of the eight sets define three of the fifteen sets for a vertical filter support, and four of the eight sets define nine of the fifteen sets for a two-dimensional filter support.

39. The device of claim 38, wherein the two-dimensional support comprises 12 filter support positions surrounding nine sub-pixel positions.

40. A device comprising:
means for defining eight sets of filter coefficients for fifteen sub-pixel positions based on coefficient symmetry and pixel symmetry, wherein the filter coefficients are used for interpolation filtering during motion compensation, and wherein at least one set of filter coefficients defines a two-dimensional filter support with a radial shape;
means for encoding video data using interpolation filters and the eight sets of filter coefficients; and
means for outputting the eight sets of filter coefficients as part of an encoded bitstream.

41. The device of claim 40, further comprising means for outputting the eight sets of filter coefficients for every coded unit of the encoded bitstream.

42. The device of claim 40, wherein the fifteen sub-pixel positions correspond to every half-pel and quarter-pel sub-pixel location, and the eight sets, the coefficient symmetry and the pixel symmetry define filter supports for every half-pel and quarter-pel sub-pixel location.

43. A non-transitory computer-readable storage medium comprising instructions that when executed by a processor cause the processor to:
upon receiving eight sets of filter coefficients as part of an encoded video bitstream,
generate fifteen sets of filter coefficients corresponding to fifteen different sub-pixel locations based on the eight sets of filter coefficients, wherein the fifteen sets of filter coefficients are used for interpolation filtering during motion compensation, and wherein at least one set of filter coefficients defines a two-dimensional filter support with a radial shape;

generate interpolated predictive data for video decoding based on one of the fifteen sets of filter coefficients, wherein the interpolated predictive data corresponds to one of the fifteen different sub-pixel locations; and decode one or more video blocks based on the interpolated predictive data.

44. The non-transitory computer-readable storage medium of claim 43, wherein at least some of the eight sets of filter coefficients have coefficient symmetry such that a given set with coefficient symmetry comprise a subset of the filter coefficients associated with a filter support for a given sub-pixel location associated with the given set.

45. The non-transitory computer-readable storage medium of claim 43, wherein the instructions cause the processor to generate the fifteen sets of filter coefficients based at least in part on pixel symmetry between two or more different sub-pixel locations.

46. The non-transitory computer-readable storage medium of claim 43, wherein the instructions cause the processor to generate the fifteen sets of filter coefficients based at least in part on pixel symmetry between two or more different sub-pixel locations, and based at least in part on coefficient symmetry defined for a given set such that the given set with coefficient symmetry comprise a subset of the filter coefficients associated with a filter support for a given sub-pixel location associated with the given set.

47. The non-transitory computer-readable storage medium of claim 43, wherein pixel symmetry exists between different ones of the fifteen sets of filter coefficients in a vertical dimension and in a horizontal dimension, but pixel symmetry does not exist in a diagonal dimension for at least some of the fifteen sets of filter coefficients.

48. The non-transitory computer-readable storage medium of claim 43, wherein two of the eight sets define three of the fifteen sets for a horizontal filter support, two of the eight sets define three of the fifteen sets for a vertical filter support, and four of the eight sets define nine of the fifteen sets for a two-dimensional filter support.

49. The non-transitory computer-readable storage medium of claim 48, wherein the two-dimensional support comprises 12 filter support positions surrounding nine sub-pixel positions.

50. A non-transitory computer-readable storage medium comprising instructions that when executed by a processor cause the processor to:

define eight sets of filter coefficients for fifteen sub-pixel positions based on coefficient symmetry and pixel symmetry, wherein the filter coefficients are used for interpolation filtering during motion compensation, and wherein at least one set of filter coefficients defines a two-dimensional filter support with a radial shape;

encode video data using interpolation filters and the eight sets of filter coefficients; and output the eight sets of filter coefficients as part of an encoded bitstream.

* * * * *